United States Patent
Master et al.

(10) Patent No.: US 7,325,123 B2
(45) Date of Patent: *Jan. 29, 2008

(54) HIERARCHICAL INTERCONNECT FOR CONFIGURING SEPARATE INTERCONNECTS FOR EACH GROUP OF FIXED AND DIVERSE COMPUTATIONAL ELEMENTS

(75) Inventors: Paul L. Master, Sunnyvale, CA (US); Eugene Hogenauer, San Carlos, CA (US); Walter James Scheuermann, Saratoga, CA (US)

(73) Assignee: QST Holdings, LLC, Palo Alto, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/384,486

(22) Filed: Mar. 7, 2003

(65) Prior Publication Data

US 2003/0154357 A1    Aug. 14, 2003

Related U.S. Application Data

(63) Continuation-in-part of application No. 09/815,122, filed on Mar. 22, 2001, now Pat. No. 6,836,839.

(51) Int. Cl.
G06F 15/76    (2006.01)
(52) U.S. Cl. .......................................... 712/37; 712/15
(58) Field of Classification Search ................... None
See application file for complete search history.

(56) References Cited

U.S. PATENT DOCUMENTS

| 4,694,416 A | * | 9/1987 | Wheeler et al. ............ 708/408 |
| 5,450,557 A | | 9/1995 | Kopp et al. |
| 5,479,055 A | * | 12/1995 | Eccles .......................... 307/38 |
| 5,646,544 A | | 7/1997 | Iadanza |
| 5,646,545 A | | 7/1997 | Trimberger et al. |
| 5,737,631 A | | 4/1998 | Trimberger |
| 5,768,561 A | | 6/1998 | Wise |
| 5,794,062 A | | 8/1998 | Baxter |
| 5,828,858 A | | 10/1998 | Athanas et al. |
| 5,873,045 A | | 2/1999 | Lee et al. |
| 5,886,537 A | | 3/1999 | Macias et al. |

(Continued)

OTHER PUBLICATIONS

Zhang, Hui et al., "A 1V Heterogeneous Reconfigurable Processor IC for Baseband Wireless Applications", 2000 IEEE Solid-State Circuits Conference, Feb. 7, 2000, pp. 68-69, XP010378803, ISBN: 07803-5853-8/00.

(Continued)

*Primary Examiner*—Kenneth S. Kim
(74) *Attorney, Agent, or Firm*—Marc S. Kaufman; Nixon Peabody LLP

(57) ABSTRACT

An integrated circuit having computational elements. As least one of the computational elements has a fixed architecture. An interconnection network is coupled to a first group of the computational elements to configure the first group for a first operation. An interconnection network is coupled to a second group of computational elements to configures the second group for a second operation.

46 Claims, 22 Drawing Sheets

U.S. PATENT DOCUMENTS

| | | | |
|---|---|---|---|
| 5,889,816 A | 3/1999 | Agrawal et al. | |
| 5,892,961 A | 4/1999 | Trimberger | |
| 5,907,580 A | 5/1999 | Cummings | |
| 5,910,733 A | 6/1999 | Bertolet et al. | |
| 5,956,518 A | 9/1999 | DeHon et al. | |
| 5,959,881 A | 9/1999 | Trimberger et al. | |
| 5,963,048 A | 10/1999 | Harrison et al. | |
| 5,966,534 A | 10/1999 | Cooke et al. | |
| 5,970,254 A | 10/1999 | Cooke et al. | |
| 6,023,742 A | 2/2000 | Ebeling et al. | |
| 6,047,115 A | 4/2000 | Mohan et al. | |
| 6,088,043 A | 7/2000 | Kelleher et al. | |
| 6,094,065 A | 7/2000 | Tavana et al. | |
| 6,120,551 A | 9/2000 | Law et al. | |
| 6,150,838 A | 11/2000 | Wittig et al. | |
| 6,230,307 B1 | 5/2001 | Davis et al. | |
| 6,237,029 B1 | 5/2001 | Master et al. | |
| 6,266,760 B1 * | 7/2001 | DeHon et al. | 712/15 |
| 6,282,627 B1 | 8/2001 | Wong et al. | |
| 6,346,824 B1 * | 2/2002 | New | 326/39 |
| 6,353,841 B1 | 3/2002 | Marshall et al. | |
| 6,408,039 B1 | 6/2002 | Ito | |
| 6,433,578 B1 | 8/2002 | Wasson | |
| 6,538,470 B1 * | 3/2003 | Langhammer et al. | 326/41 |
| 6,556,044 B2 * | 4/2003 | Langhammer et al. | 326/40 |

OTHER PUBLICATIONS

Alsolaim, A et al., "Architecture and Application of a Dynamically Reconfigurable Hardware Array for Future Mobile Communication Systems", Field Programmable Custom Computing Machines, 2000 IEEE Symposium, Napa Valley, Los Alamitos, CA Apr. 17-19, 2000, IEEE Comput. Soo., Apr. 17, 2000, pp. 205-214, XP010531939, ISBN 0-7695-0871-5/00.

Becker, J et al., "Design and Implementation of a Coarse-Grained Dynamically Reconfigurable Hardware Architecture", VLSI 2001, Proceedings IEEE Computer Soc. Workshop, Apr. 19-20, 2001, Piscataway, NJ, USA, Apr. 19, 2001, pp. 41-46, XP010541755, ISBN: 0-7695-1056-6/01.

Abnous A. et al.: "Ultra-low-power domain-specific multimedia processors", VLSI Signal Processing, IX, 1996, IEEE Workshop in San Francisco, CA, USA, Oct. 30-Nov. 1, 1996, pp. 461-470; XP010199037, ISBN: 0-7803-3134-6.

Baumgarte, V. et al., "PACT XPP—A Self-Reconfigurable Data Processing Architecture", NN, Jun. 25, 2001, XP002256066.

Hartenstein, R. "Coarse Grain Reconfigurable Architectures", Design Automation Conference, 2001. Proceedings of the ASP-DAC 2001, Asia and South Pacific Jan. 30-Jan. 2, 2001, Piscataway, NJ, US, IEEE Jan. 30, 2001, pp. 564-569, XP010537867, ISBN: 0-7803-6633-6.

* cited by examiner

FIG. B

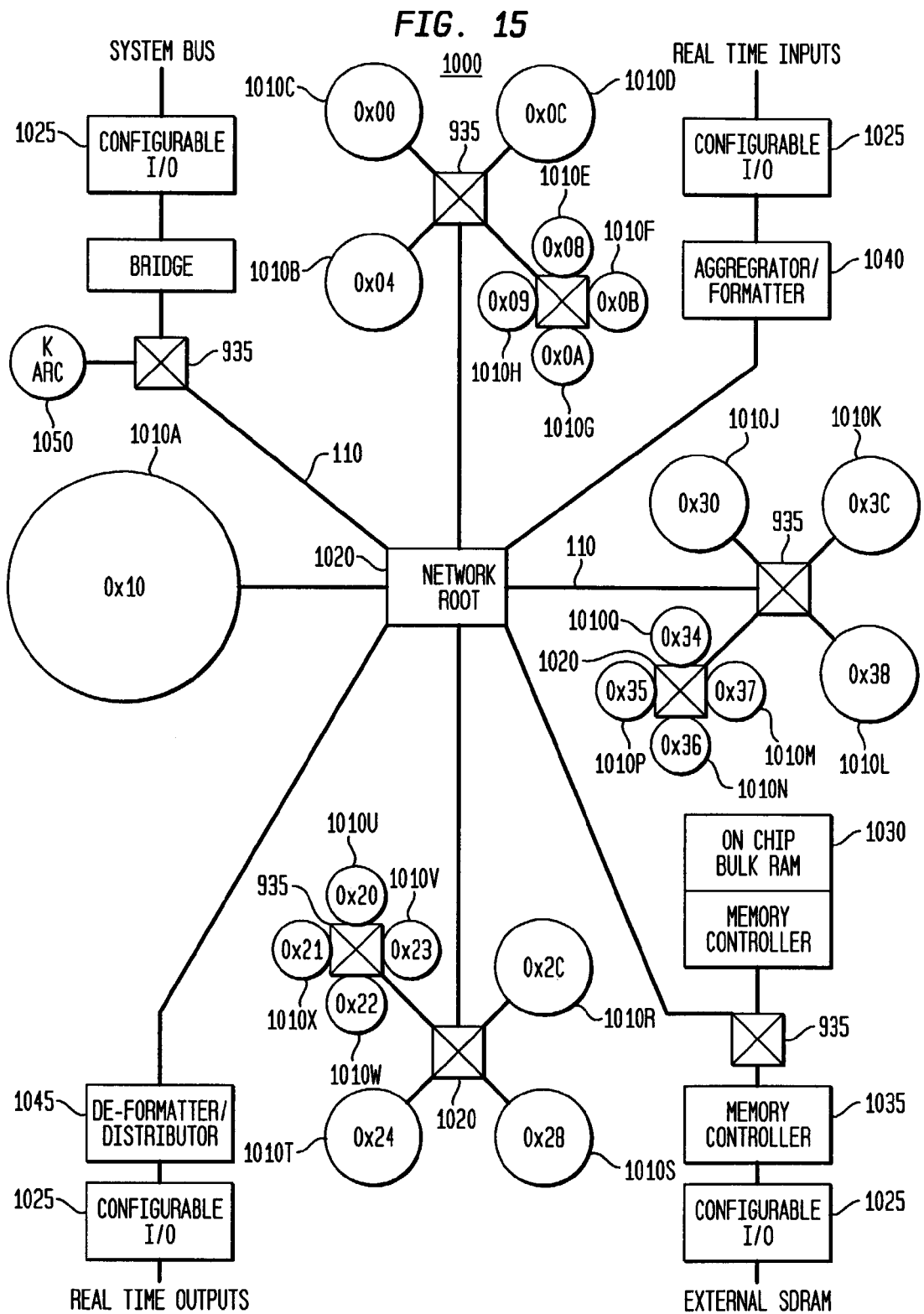

HIERARCHICAL INTERCONNECT FOR CONFIGURING SEPARATE INTERCONNECTS FOR EACH GROUP OF FIXED AND DIVERSE COMPUTATIONAL ELEMENTS

CROSS-REFERENCE TO A RELATED APPLICATION

This application is a continuation-in-part of Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, now U.S. Pat. No. 6,836,839 commonly assigned to QuickSilver Technology, Inc., and incorporated by reference herein, with priority claimed for all commonly disclosed subject matter (the "related application").

FIELD OF THE INVENTION

The present invention relates, in general, to integrated circuits and, more particularly, to adaptive integrated circuitry with heterogeneous and reconfigurable matrices of diverse and adaptive computational units having fixed, application specific computational elements.

BACKGROUND OF THE INVENTION

The advances made in the design and development of integrated circuits ("ICs") have generally produced ICs of several different types or categories having different properties and functions, such as the class of universal Turing machines (including microprocessors and digital signal processors ("DSPs")), application specific integrated circuits ("ASICs"), and field programmable gate arrays ("FPGAs"). Each of these different types of ICs, and their corresponding design methodologies, have distinct advantages and disadvantages.

Microprocessors and DSPs, for example, typically provide a flexible, software programmable solution for the implementation of a wide variety of tasks. As various technology standards evolve, microprocessors and DSPs may be reprogrammed, to varying degrees, to perform various new or altered functions or operations. Various tasks or algorithms, however, must be partitioned and constrained to fit the physical limitations of the processor, such as bus widths and hardware availability. In addition, as processors are designed for the execution of instructions, large areas of the IC are allocated to instruction processing, with the result that the processors are comparatively inefficient in the performance of actual algorithmic operations, with only a few percent of these operations performed during any given clock cycle. Microprocessors and DSPs, moreover, have a comparatively limited activity factor, such as having only approximately five percent of their transistors engaged in algorithmic operations at any given time, with most of the transistors allocated to instruction processing. As a consequence, for the performance of any given algorithmic operation, processors consume significantly more IC (or silicon) area and consume significantly more power compared to other types of ICs, such as ASICs.

While having comparative advantages in power consumption and size, ASICs provide a fixed, rigid or "hard-wired" implementation of transistors (or logic gates) for the performance of a highly specific task or a group of highly specific tasks. ASICs typically perform these tasks quite effectively, with a comparatively high activity factor, such as with twenty-five to thirty percent of the transistors engaged in switching at any given time. Once etched, however, an ASIC is not readily changeable, with any modification being time-consuming and expensive, effectively requiring new masks and new fabrication. As a further result, ASIC design virtually always has a degree of obsolescence, with a design cycle lagging behind the evolving standards for product implementations. For example, an ASIC designed to implement GSM or CDMA standards for mobile communication becomes relatively obsolete with the advent of a new standard, such as 3G.

FPGAs have evolved to provide some design and programming flexibility, allowing a degree of post-fabrication modification. FPGAs typically consist of small, identical sections or "islands" of programmable logic (logic gates) surrounded by many levels of programmable interconnect, and may include memory elements. FPGAs are homogeneous, with the IC comprised of repeating arrays of identical groups of logic gates, memory and programmable interconnect. A particular function may be implemented by configuring (or reconfiguring) the interconnect to connect the various logic gates in particular sequences and arrangements. The most significant advantage of FPGAs is their post-fabrication reconfigurability, allowing a degree of flexibility in the implementation of changing or evolving specifications or standards. The reconfiguring process for an FPGA is comparatively slow, however, and is typically unsuitable for most real time, immediate applications.

While this post-fabrication flexibility of FPGAs provides a significant advantage, FPGAs have corresponding and inherent disadvantages. Compared to ASICs, FPGAs are very expensive and very inefficient for implementation of particular functions, and are often subject to a "combinatorial explosion" problem. More particularly, for FPGA implementation, an algorithmic operation comparatively may require orders of magnitude more IC area, time and power, particularly when the particular algorithmic operation is a poor fit to the pre-existing, homogeneous islands of logic gates of the FPGA material. In addition, the programmable interconnect, which should be sufficiently rich and available to provide reconfiguration flexibility, has a correspondingly high capacitance, resulting in comparatively slow operation and high power consumption. For example, compared to an ASIC, an FPGA implementation of a relatively simple function, such as a multiplier, consumes significant IC area and vast amounts of power, while providing significantly poorer performance by several orders of magnitude. In addition, there is a chaotic element to FPGA routing, rendering FPGAs subject to unpredictable routing delays and wasted logic resources, typically with approximately one-half or more of the theoretically available gates remaining unusable due to limitations in routing resources and routing algorithms.

Various prior art attempts to meld or combine these various processor, ASIC and FPGA architectures have had utility for certain limited applications, but have not proven to be successful or useful for low power, high efficiency, and real time applications. Typically, these prior art attempts have simply provided, on a single chip, an area of known FPGA material (consisting of a repeating array of identical logic gates with interconnect) adjacent to either a processor or an ASIC, with limited interoperability, as an aid to either processor or ASIC functionality. For example, Trimberger U.S. Pat. No. 5,737,631, entitled "Reprogrammable Instruction Set Accelerator", issued Apr. 7, 1998, is designed to provide instruction acceleration for a general purpose processor, and merely discloses a host CPU made up of such a basic microprocessor combined in parallel with known FPGA material (with an FPGA configuration store, which together form the reprogrammable instruction set accelerator). This reprogrammable instruction set accelerator, while allowing for some post-fabrication reconfiguration flexibility and processor acceleration, is nonetheless subject to the various disadvantages of traditional processors and traditional FPGA material, such as high power consumption and high capacitance, with comparatively low speed, low efficiency and low activity factors.

Tavana et al. U.S. Pat. No. 6,094,065, entitled "Integrated Circuit with Field Programmable and Application Specific Logic Areas", issued Jul. 25, 2000, is designed to allow a degree of post-fabrication modification of an ASIC, such as for correction of design or other layout flaws, and discloses use of a field programmable gate array in a parallel combination with a mask-defined application specific logic area (i.e., ASIC material). Once again, known FPGA material, consisting of a repeating array of identical logic gates within a rich programmable interconnect, is merely placed adjacent to ASIC material within the same silicon chip. While potentially providing post-fabrication means for "bug fixes" and other error correction, the prior art IC is nonetheless subject to the various disadvantages of traditional ASICs and traditional FPGA material, such as highly limited reprogrammability of an ASIC, combined with high power consumption, comparatively low speed, low efficiency and low activity factors of FPGAs.

SUMMARY OF THE INVENTION

The present invention provides a new form or type of integrated circuitry which effectively and efficiently combines and maximizes the various advantages of processors, ASICs and FPGAs, while minimizing potential disadvantages. In accordance with the present invention, such a new form or type of integrated circuit, referred to as an adaptive computing engine ("ACE"), is disclosed which provides the programming flexibility of a processor, the post-fabrication flexibility of FPGAs, and the high speed and high utilization factors of an ASIC. The ACE integrated circuitry of the present invention is readily reconfigurable, in real time, and is capable of having corresponding, multiple modes of operation. In selected embodiments, the ACE may also minimize power consumption while increasing performance, with particular suitability for low power applications, such as for use in hand-held and other battery-powered devices.

The ACE architecture of the present invention, for adaptive or reconfigurable computing, includes a plurality of heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real time to adapt (configure and reconfigure) the plurality of heterogeneous computational elements for a plurality of different functional modes, including linear algorithmic operations, nonlinear algorithmic operations, finite state machine operations, memory operations, and bit-level manipulations.

As illustrated and discussed in greater detail below, the ACE architecture of the present invention provides a single IC, which may be adapted in real time, using these fixed and application specific computation elements, to perform a wide variety of tasks. For example, utilizing differing configurations over time of the same set of heterogeneous computational elements, the ACE architecture may implement functions such as finite impulse response filtering, fast Fourier transformation, discrete cosine transformation, and with other types of computational elements, may implement many other high level processing functions for advanced communications and computing.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 15 is a block diagram illustrating an exemplary second system embodiment 1000 in accordance with the present invention.

DETAILED DESCRIPTION OF THE INVENTION

Figure 1:
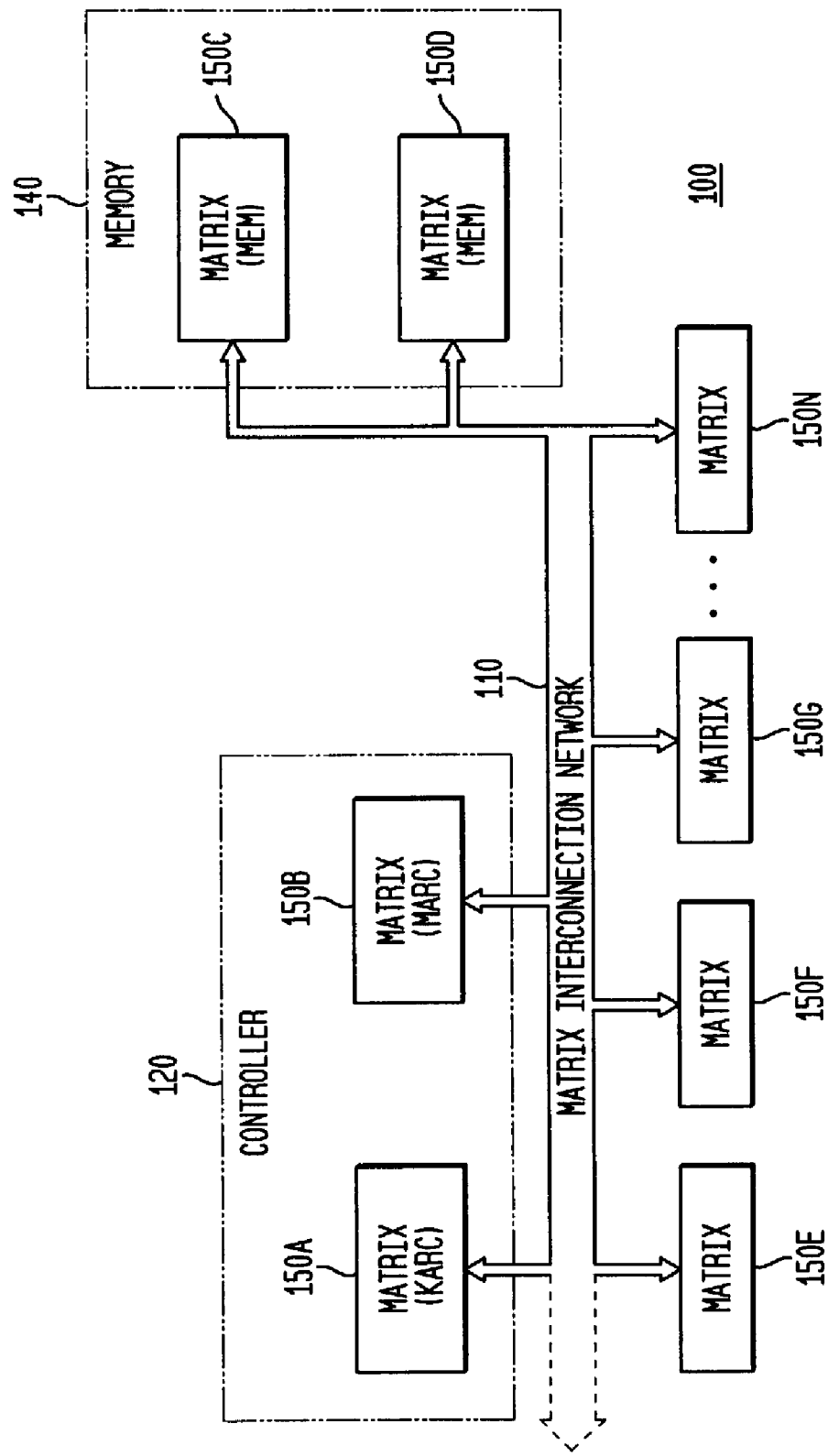
FIG. 1 is a block diagram illustrating an exemplary first apparatus embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, the present invention provides a new form or type of integrated circuit, referred to as an adaptive computing engine (ACE), which provides the programming flexibility of a processor, the post-fabrication flexibility of FPGAs, and the high speed and high utilization factors of an ASIC. The ACE integrated circuitry of the present invention is readily adaptive (or reconfigurable), in real time, and is capable of having corresponding, multiple modes of operation. The present invention may also be utilized to minimize power consumption while increasing performance, with particular suitability for low power applications.

FIG. 1 is a block diagram illustrating a first apparatus 100 embodiment in accordance with the present invention. The apparatus 100, referred to herein as an adaptive computing engine ("ACE") 100, is preferably embodied as an integrated circuit, or as a portion of an integrated circuit having other, additional components. In the first apparatus embodiment, and as discussed in greater detail below, the ACE 100 includes one or more reconfigurable matrices (or nodes) 150, such as matrices 150A through 150N as illustrated, and a matrix interconnection network 110. Also in the first apparatus embodiment, and as discussed in detail below, one or more of the matrices (nodes) 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, direct memory access (DMA), random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the first apparatus embodiment, the memory 140 is included within the ACE 100, and preferably is comprised of computational elements which are low power consumption random access memory (RAM), but also may be comprised of computational elements of any other form of memory, such as flash, DRAM, SRAM, SDRAM, FRAM, MRAM, ROM, EPROM or $E^2$PROM. In the first apparatus embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module. The kernel controller is also referred to as a "K-node", discussed in greater detail below with reference to FIGS. 10 and 11.

Figure 3:
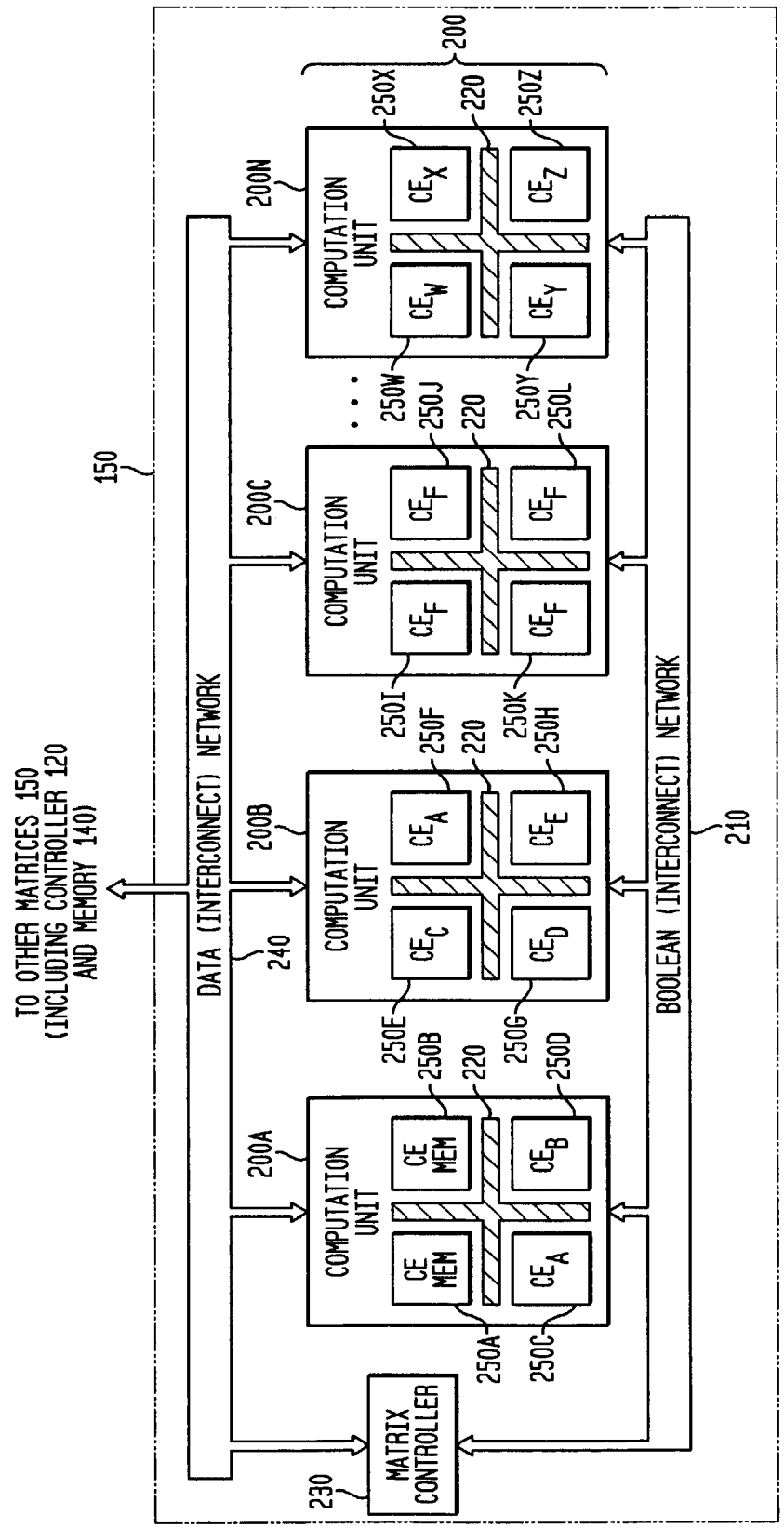
FIG. 3 is a block diagram illustrating a reconfigurable matrix (or node), a plurality of computation units, and a plurality of computational elements, in accordance with the present invention.
Figure 4:
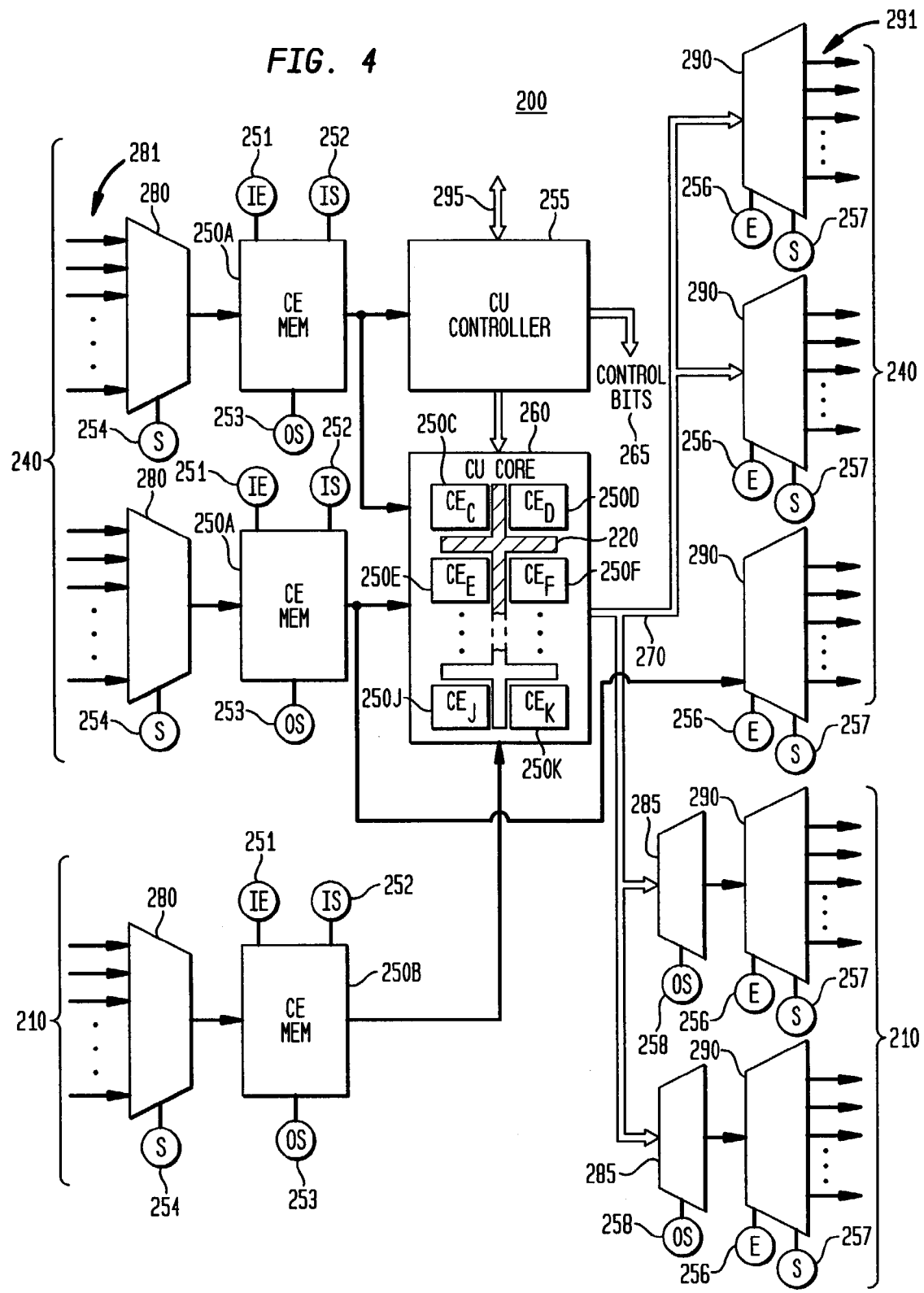
FIG. 4 is a block diagram illustrating, in greater detail, a computational unit of a reconfigurable matrix in accordance with the present invention.

The matrix interconnection network ("MIN") 110 of FIG. 1, and its subset interconnection networks separately illustrated in FIGS. 3 and 4 (Boolean interconnection network 210, data interconnection network 240, and interconnect 220), individually, collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the first apparatus embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses. In the second apparatus embodiment, the various interconnection networks are implemented as described below with reference to FIGS. 12 and 13, using various combinations of routing elements, such as token rings or arbiters, and multiplexers, at varying levels within the system and apparatus embodiments of the present invention.

It should be pointed out, however, that while any given level of switching or selecting operation of or within the various interconnection networks (110, 210, 240 and 220) may be implemented as known in the art, the combinations of routing elements and multiplexing elements, the use of different routing elements and multiplexing elements at differing levels within the system, and the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real time operation of the ACE 100 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 3) of the matrices 150, such as pluralities of multipliers, complex multipliers, and adders, each of which are designed for optimal execution of corresponding multiplication, complex multiplication, and addition functions. Given that the ACE 100 is to be optimized, in the first apparatus embodiment, for low power consumption, the functions for acceleration are selected based upon power consumption. For example, for a given application such as mobile communication, corresponding C (C# or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 3, other functionality, such as control code, may be accelerated within matrices 150 when configured as finite state machines.

Figure 2:
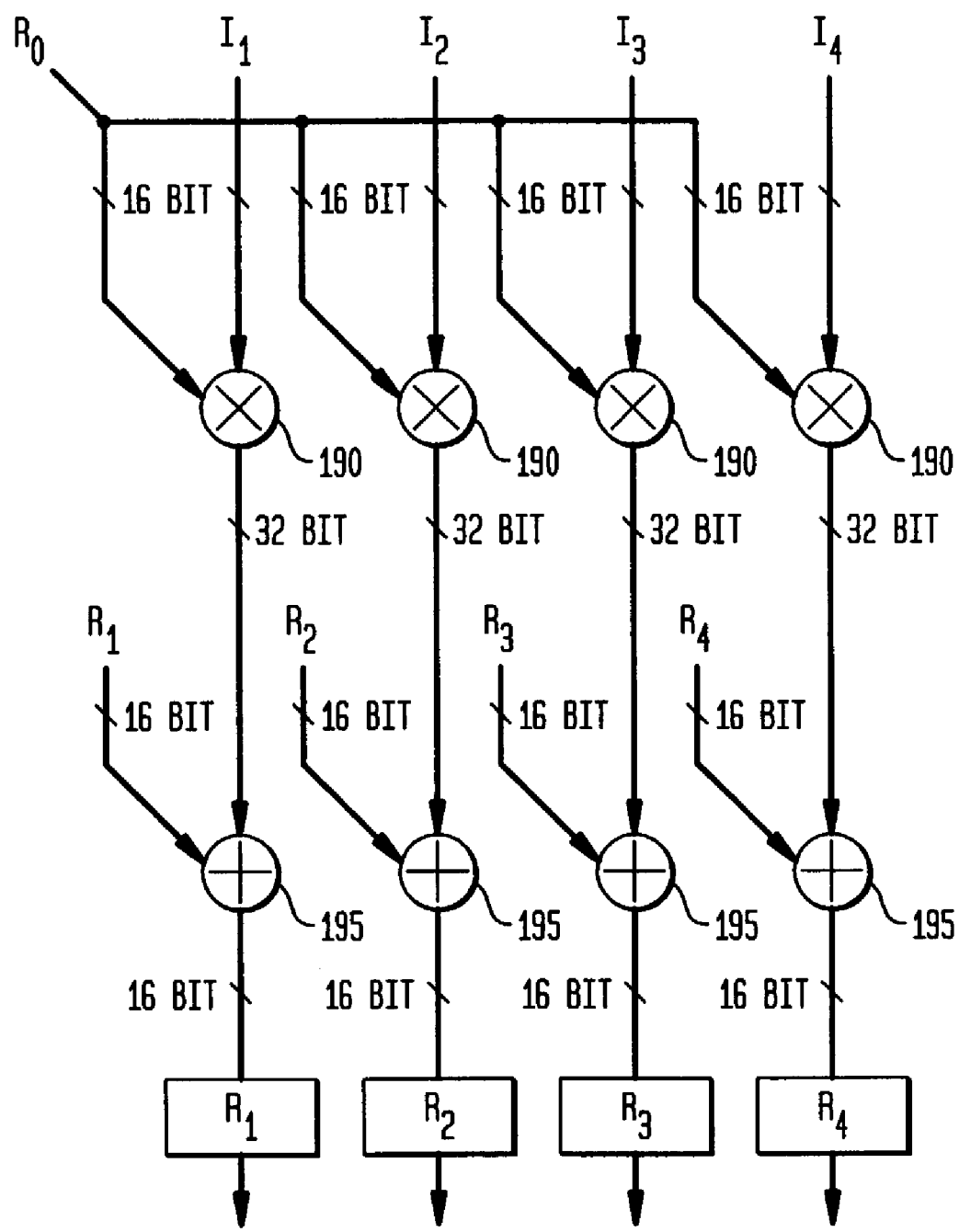
FIG. 2 is a schematic diagram illustrating an exemplary data flow graph in accordance with the present invention.

Next, the ACE 100 utilizes a data flow model for all processes and computations. Algorithms or other functions selected for acceleration may be converted into a form which may be represented as a "data flow graph" ("DFG"). A schematic diagram of an exemplary data flow graph, in accordance with the present invention, is illustrated in FIG. 2. As illustrated in FIG. 2, an algorithm or function useful for CDMA voice coding (QCELP (Qualcomm code excited linear prediction)) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real time which is optimized to perform the particular algorithm. Continuing with the exemplary DFG or FIG. 2, four fixed or dedicated multipliers, as computational elements 250, and four fixed or dedicated adders, also as different computational elements 250, are configured in real time through the interconnect to perform the functions or algorithms of the particular DFG. Using this data flow model, data which is produced, such as by the multipliers 190, is immediately consumed, such as by adders 195.

The third and perhaps most significant concept of the present invention, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, accumulators, arithmetic logic units (ALUs), registers, and adders. Utilizing interconnect (210 and 220), these differing, heterogeneous computational elements (250) may then be adaptively configured, in real time, to perform the selected algorithm, such as the performance of discrete cosine transformations often utilized in mobile communications. For the data flow graph example of FIG. 2, four multipliers and four adders will be configured, i.e., connected in real time, to perform the particular algorithm. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 100 may co-evolve and be reconfigured to implement the new algorithm. For a simplified example, a fifth multiplier and a fifth adder may be incorporated into the DFG of FIG. 2 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between adaptation (configuration and reconfiguration), on the one hand, and programming or reprogrammability, on the other hand. Typical programmability utilizes a pre-existing group or set of functions, which may be called in various orders, over time, to implement a particular algorithm. In contrast, configurability and reconfigurability (or adaptation), as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as a "silverware" module, is the subject of a separate, related patent application. For purposes of the present invention, however, it is sufficient to note that this coupling of data and configuration information into one information (or bit) stream helps to enable real time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 1, the functions of the controller 120 (preferably matrix (KARC) 150A and matrix (MARC) 150B, configured as finite state machines) may be explained: (1) with reference to a silverware module, namely, the tight coupling of data and configuration information within a single stream of information; (2) with reference to multiple potential modes of operation; (3) with reference to the reconfigurable matrices 150; and (4) with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the first apparatus embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the first apparatus embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100. Additional functions of the kernel controller, as a K-node, are discussed in greater detail below.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the first apparatus embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150. This matrix control functionality may also be combined with kernel control, such as in the K-node, discussed below.

FIG. 3 is a block diagram illustrating, in greater detail, a reconfigurable matrix (or node) 150 with a plurality of computation units 200 (illustrated as computation units 200A through 200N), and a plurality of computational elements 250 (illustrated as computational elements 250A through 250Z), and provides additional illustration of the exemplary types of computational elements 250 and a useful summary of the present invention. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The matrix controller 230 may also be implemented as a hardware task manager, discussed below with reference to FIG. 10. As mentioned above, in the first apparatus embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality. It should also be noted that other, exemplary forms of interconnect are discussed in greater detail below with reference to FIGS. 11-13.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 2, utilizing the interconnect 220, the Boolean network 210, and the matrix interconnection network 110. For example, using the multiplexing or routing capabilities discussed below, the inputs/outputs of a computational element 250 may be coupled to outputs/inputs of a first set of (other) computational elements 250, for performance of a first function or algorithm, and subsequently adapted or reconfigured, such that these inputs/outputs are coupled to outputs/inputs of a second set of (other) computational elements 250, for performance of a second function or algorithm.

In the first apparatus embodiment, the various computational elements 250 are designed and grouped together, into the various adaptive and reconfigurable computation units 200 (as illustrated, for example, in FIGS. 5A through 9). In addition to computational elements 250 which are designed to execute a particular algorithm or function, such as multiplication or addition, other types of computational elements 250 are also utilized in the first apparatus embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing, and which may be utilized within the hardware task manager, discussed below.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIGS. 5A through 5E and FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

In the first apparatus embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

As indicated above, the plurality of heterogeneous computational elements 250 may be configured and reconfigured, through the levels of the interconnect network (110, 210, 220, 240), for performance of a plurality of functional or operational modes, such as linear operations, non-linear operations, finite state machine operations, memory and memory management, and bit-level manipulation. This configuration and reconfiguration of the plurality of heterogeneous computational elements 250 through the levels of the interconnect network (110, 210, 220, 240), however, may be conceptualized on another, higher or more abstract level, namely, configuration and reconfiguration for the performance of a plurality of algorithmic elements.

At this more abstract level of the algorithmic element, the performance of any one of the algorithmic elements may be considered to require a simultaneous performance of a plurality of the lower-level functions or operations, such as move, input, output, add, subtract, multiply, complex multiply, divide, shift, multiply and accumulate, and so on, using a configuration (and reconfiguration) of computational elements having a plurality of fixed architectures such as memory, addition, multiplication, complex multiplication, subtraction, synchronization, queuing, over sampling, under sampling, adaptation, configuration, reconfiguration, control, input, output, and field programmability.

When such a plurality of fixed architectures are configured and reconfigured for performance of an entire algorithmic element, this performance may occur using comparatively few clock cycles, compared to the orders of magnitude more clock cycles typically required. The algorithmic elements may be selected from a plurality of algorithmic elements comprising, for example: a radix-2 Fast Fourier Transformation (FFT), a radix-4 Fast Fourier Transformation (FFT), a radix-2 inverse Fast Fourier Transformation (IFFT), a radix-4 IFFT, a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation. Numerous other algorithmic element examples are discussed in greater detail below with reference to FIG. 10.

In another embodiment of the ACE 100, one or more of the matrices (or nodes) 150 may be designed to be application specific, having a fixed architecture with a corresponding fixed function (or predetermined application), rather than being comprised of a plurality of heterogeneous computational elements which may be configured and reconfigured for performance of a plurality of operations, functions, or algorithmic elements. For example, an analog-to-digital (A/D) or digital-to-analog (D/A) converter may be implemented without adaptive capability. As discussed in greater detail below, common node (matrix) functions also may be implemented without adaptive capability, such as the node wrapper functions discussed below. Under various circumstances, however, the fixed function node may be capable of parameter adjustment for performance of the predetermined application. For example, the parameter adjustment may comprise changing one or more of the following parameters: a number of filter coefficients, a number of parallel input bits, a number of parallel output bits, a number of selected points for Fast Fourier Transformation, a number of bits of precision, a code rate, a number of bits of interpolation of a trigonometric function, and real or complex number valuation. This fixed function node (or matrix) 150, which may be parametizable, will typically be utilized in circumstances where an algorithmic element is used on a virtually continuous basis, such as in certain types of communications or computing applications.

For example, the fixed function node 150 may be a microprocessor (such as a RISC processor), a digital signal processor (DSP), or a co-processor, and may or may not have an embedded operating system. Such a controller or processor fixed function node 150 may be utilized for the various KARC 150A or MARC 150B applications mentioned above, such as providing configuration information to the interconnection network, directing and scheduling the configuration of the plurality of heterogeneous computational elements 250 of the other nodes 150 for performance of the various functional modes or algorithmic elements, or timing and scheduling the configuration and reconfiguration of the plurality of heterogeneous computational elements with corresponding data. In other applications, also for example, the fixed function node may be a cascaded integrated comb (CIC) filter or a parameterized, cascaded integrated comb (CIC) filter; a finite impulse response (FIR) filter or a finite impulse response (FIR) filter parameterized for variable filter length; or an A/D or D/A converter.

FIG. 4 is a block diagram illustrating, in greater detail, an exemplary or representative computation unit 200 of a reconfigurable matrix 150 in accordance with the present invention. As illustrated in FIG. 4, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the first apparatus embodiment, the selection of various input and output lines 281 and 291, and the creation of various connections through the interconnect (210, 220 and 240), is under control of control bits 265 from a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 255 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

FIGS. 5A through 5E are block diagrams illustrating, in detail, exemplary fixed and specific computational elements, forming computational units, in accordance with the present invention. As will be apparent from review of these Figures, many of the same fixed computational elements are utilized, with varying configurations, for the performance of different algorithms.

Figure 5A:
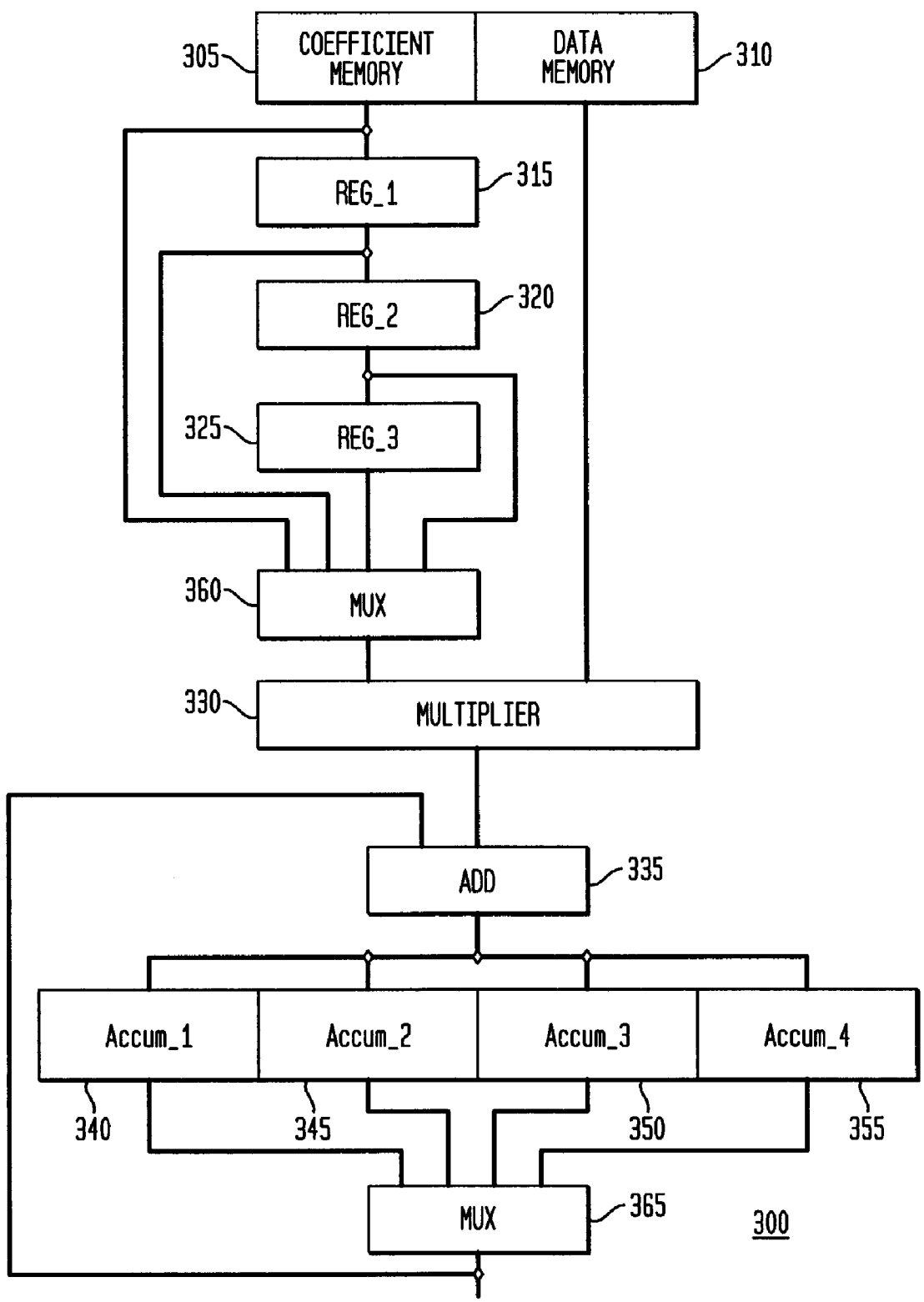
FIGS. 5A through 5E are block diagrams illustrating, in detail, exemplary fixed and specific computational elements, forming computational units, in accordance with the present invention.

FIG. 5A is a block diagram illustrating a four-point asymmetric finite impulse response (FIR) filter computational unit 300. As illustrated, this exemplary computational unit 300 includes a particular, first configuration of a plurality of fixed computational elements, including coefficient memory 305, data memory 310, registers 315, 320 and 325, multiplier 330, adder 335, and accumulator registers 340, 345, 350 and 355, with multiplexers (MUXes) 360 and 365 forming a portion of the interconnection network (210, 220 and 240).

Figure 5B:
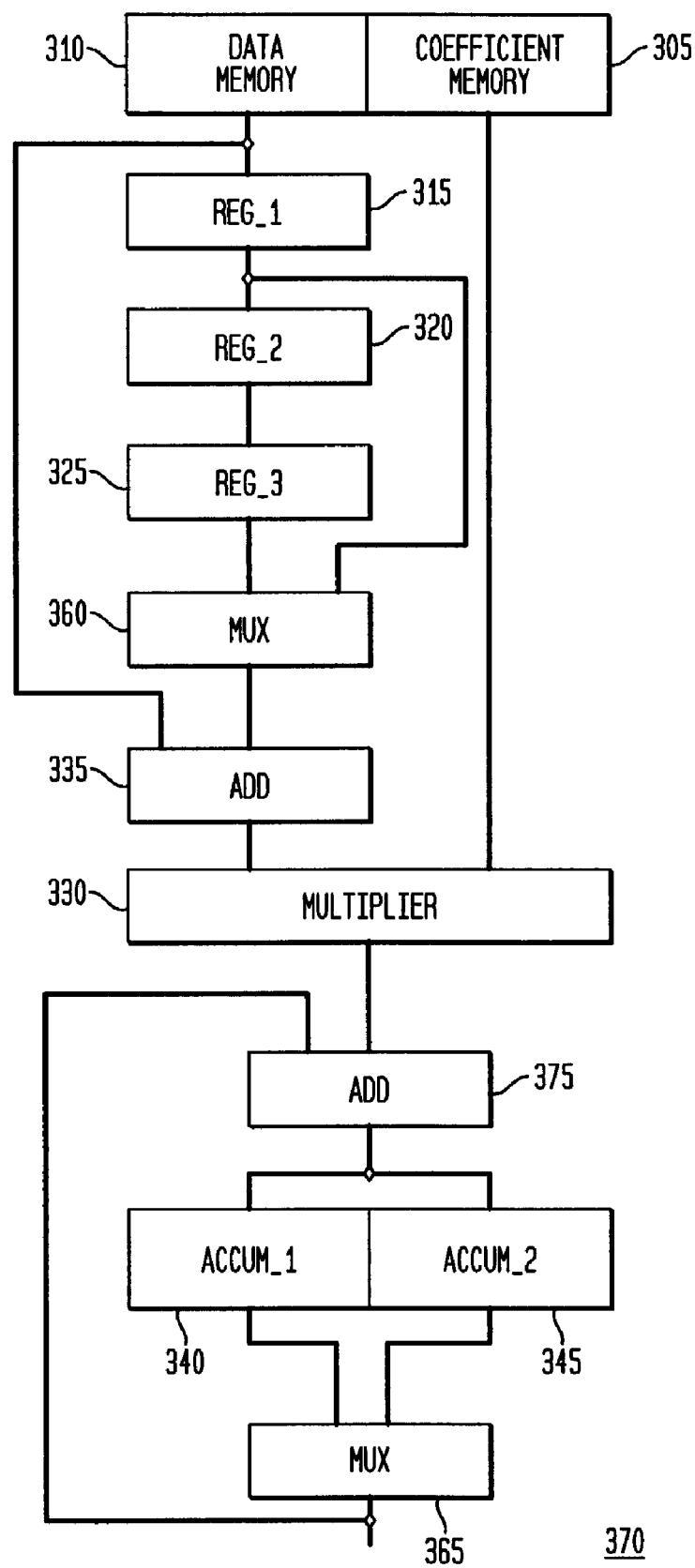

FIG. 5B is a block diagram illustrating a two-point symmetric finite impulse response (FIR) filter computational unit 370. As illustrated, this exemplary computational unit 370 includes a second configuration of a plurality of fixed computational elements, including coefficient memory 305, data memory 310, registers 315, 320 and 325, multiplier 330, adder 335, second adder 375, and accumulator registers 340 and 345, also with multiplexers (MUXes) 360 and 365 forming a portion of the interconnection network (210, 220 and 240).

Figure 5C:
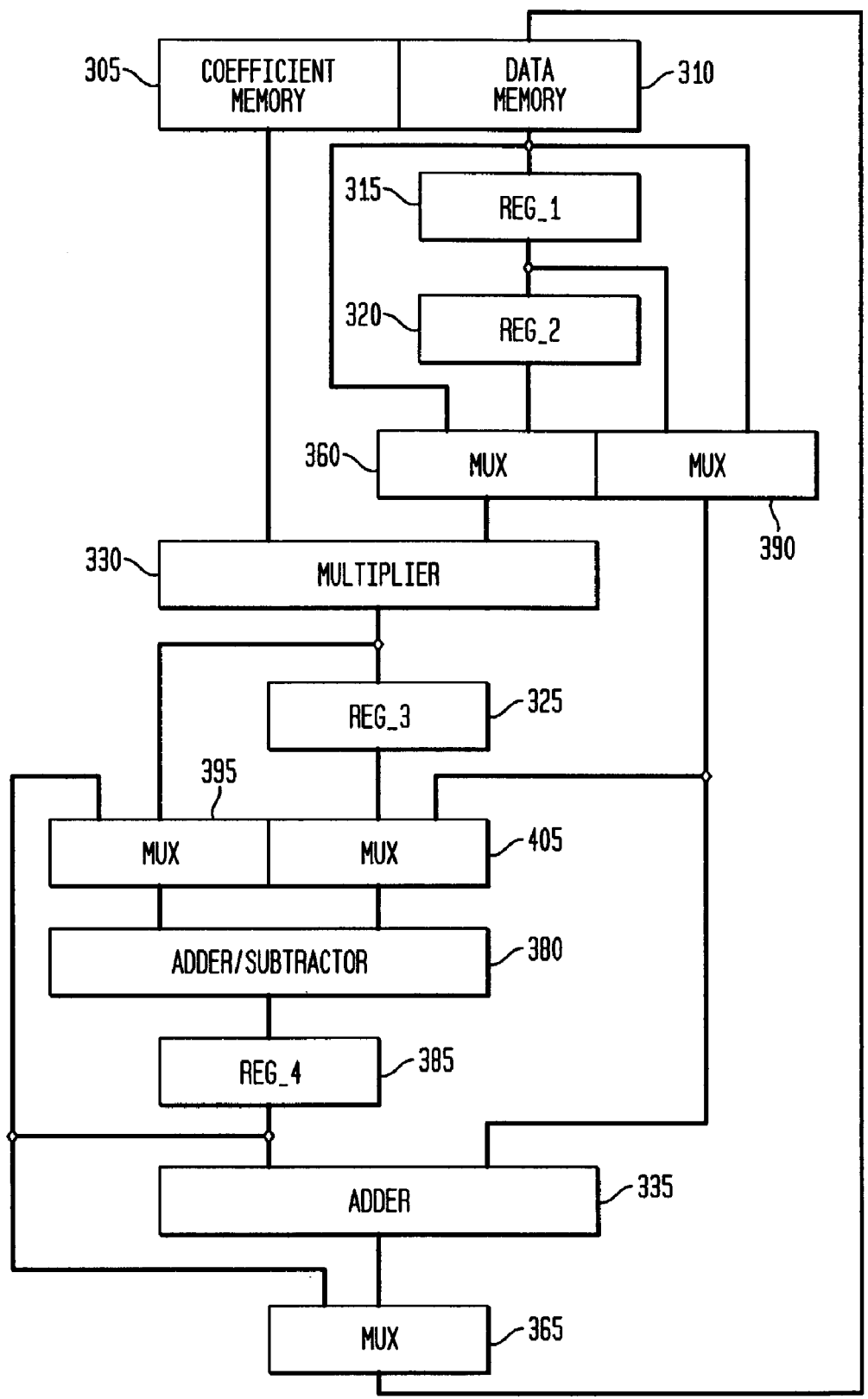

FIG. 5C is a block diagram illustrating a subunit for a fast Fourier transform (FFT) computational unit 400. As illustrated, this exemplary computational unit 400 includes a third configuration of a plurality of fixed computational elements, including coefficient memory 305, data memory 310, registers 315, 320, 325 and 385, multiplier 330, adder 335, and adder/subtracter 380, with multiplexers (MUXes) 360, 365, 390, 395 and 405 forming a portion of the interconnection network (210, 220 and 240).

Figure 5D:
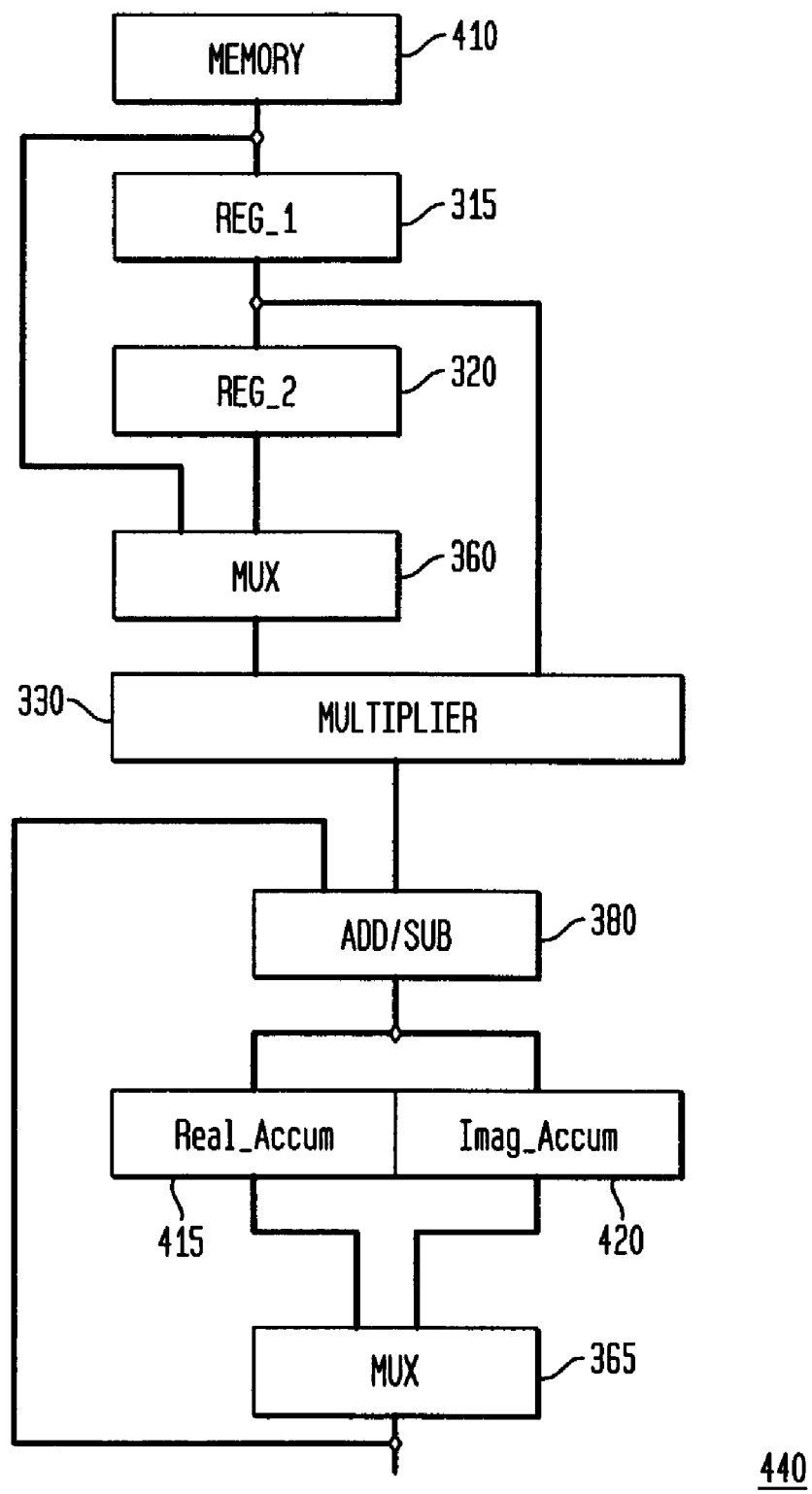

FIG. 5D is a block diagram illustrating a complex finite impulse response (FIR) filter computational unit 440. As illustrated, this exemplary computational unit 440 includes a fourth configuration of a plurality of fixed computational elements, including memory 410, registers 315 and 320, multiplier 330, adder/subtracter 380, and real and imaginary accumulator registers 415 and 420, also with multiplexers (MUXes) 360 and 365 forming a portion of the interconnection network (210, 220 and 240).

Figure 5E:
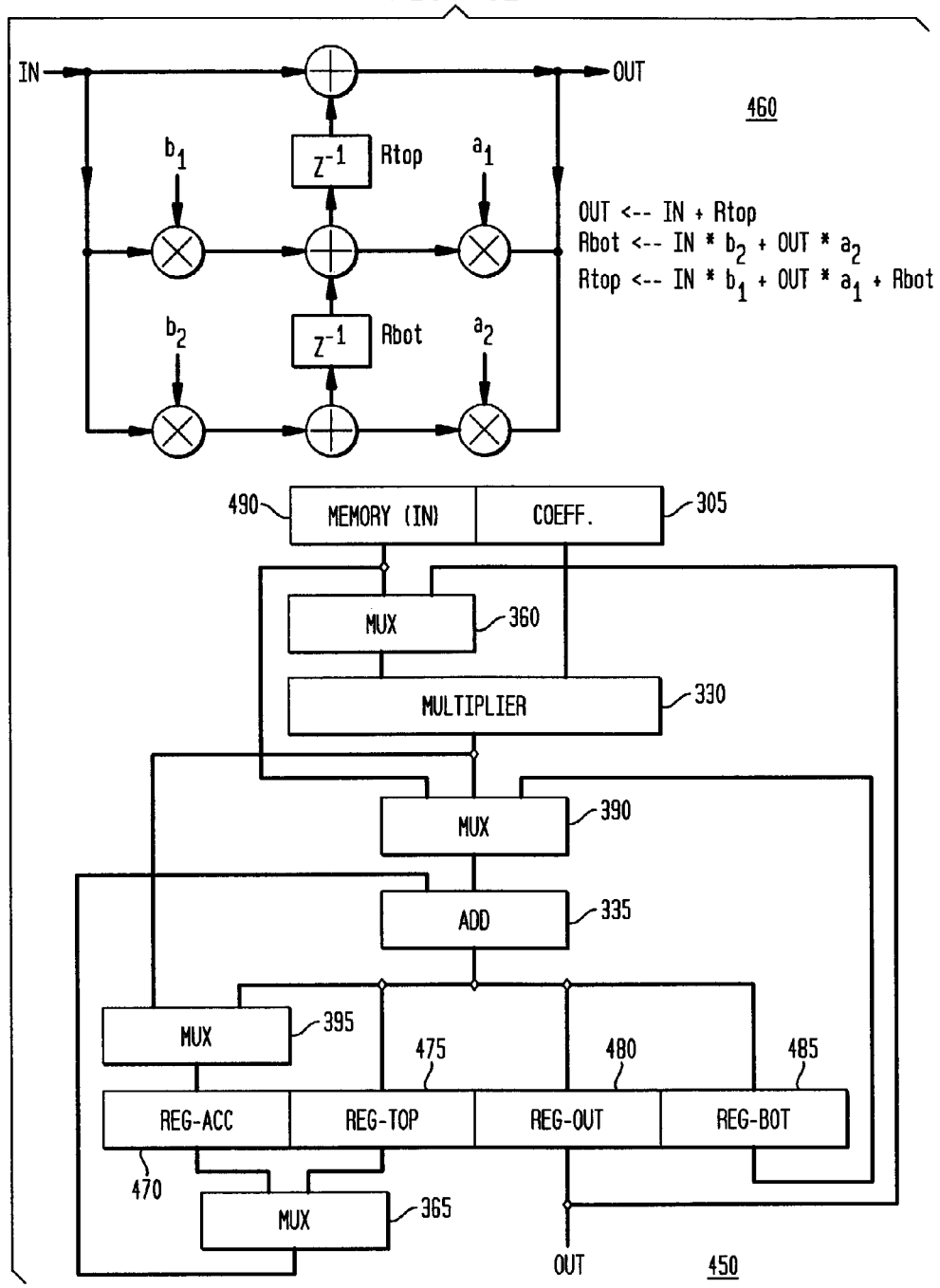

FIG. 5E is a block diagram illustrating a biquad infinite impulse response (IIR) filter computational unit 450, with a corresponding data flow graph 460. As illustrated, this exemplary computational unit 450 includes a fifth configuration of a plurality of fixed computational elements, including coefficient memory 305, input memory 490, registers 470, 475, 480 and 485, multiplier 330, and adder 335, with multiplexers (MUXes) 360, 365, 390 and 395 forming a portion of the interconnection network (210, 220 and 240).

Figure 6:
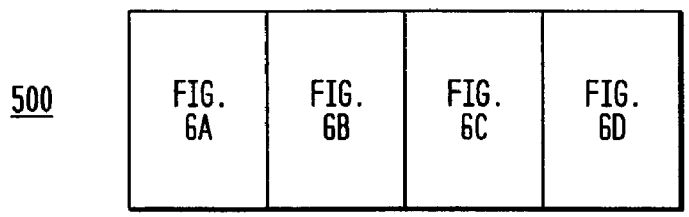
FIG. 6 is a block diagram illustrating, in detail, an exemplary multifunction adaptive computational unit having a plurality of different, fixed computational elements, in accordance with the present invention.
Figure 6A:
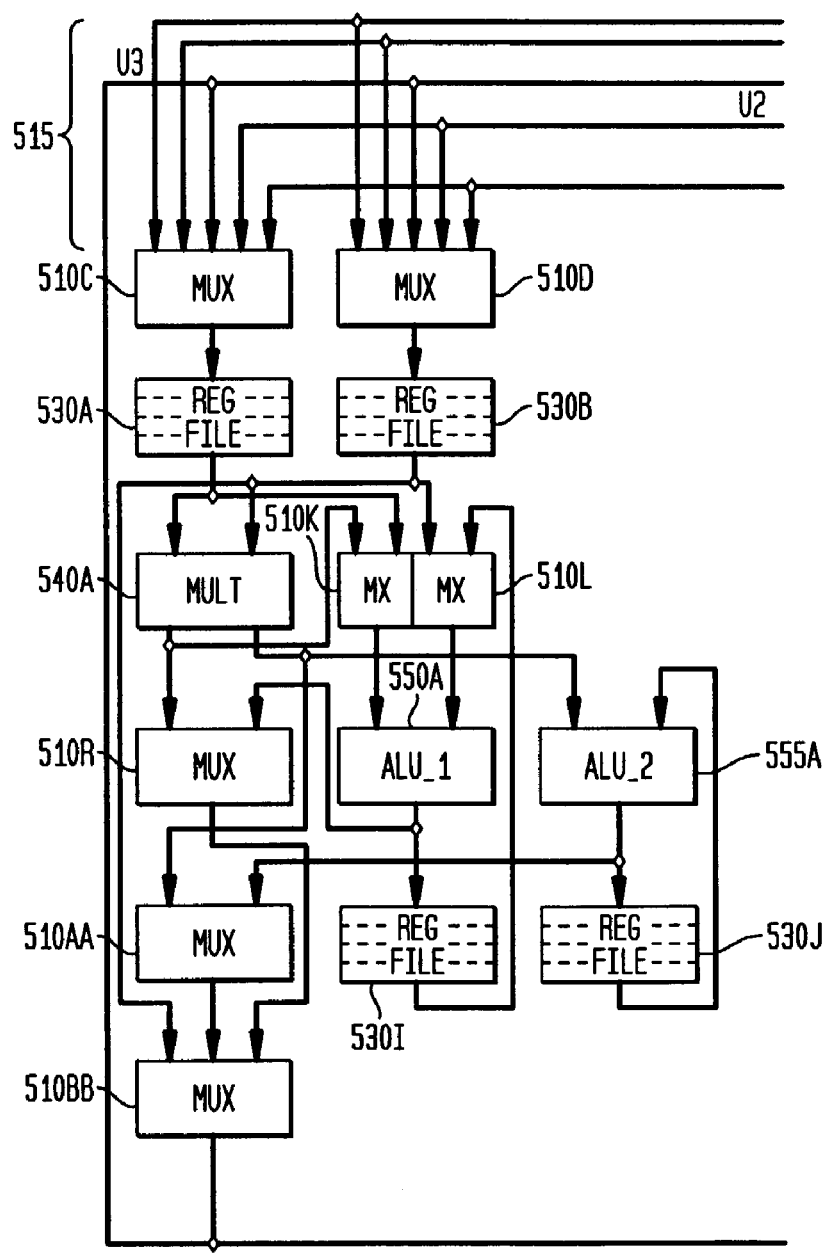
Figure 6B:
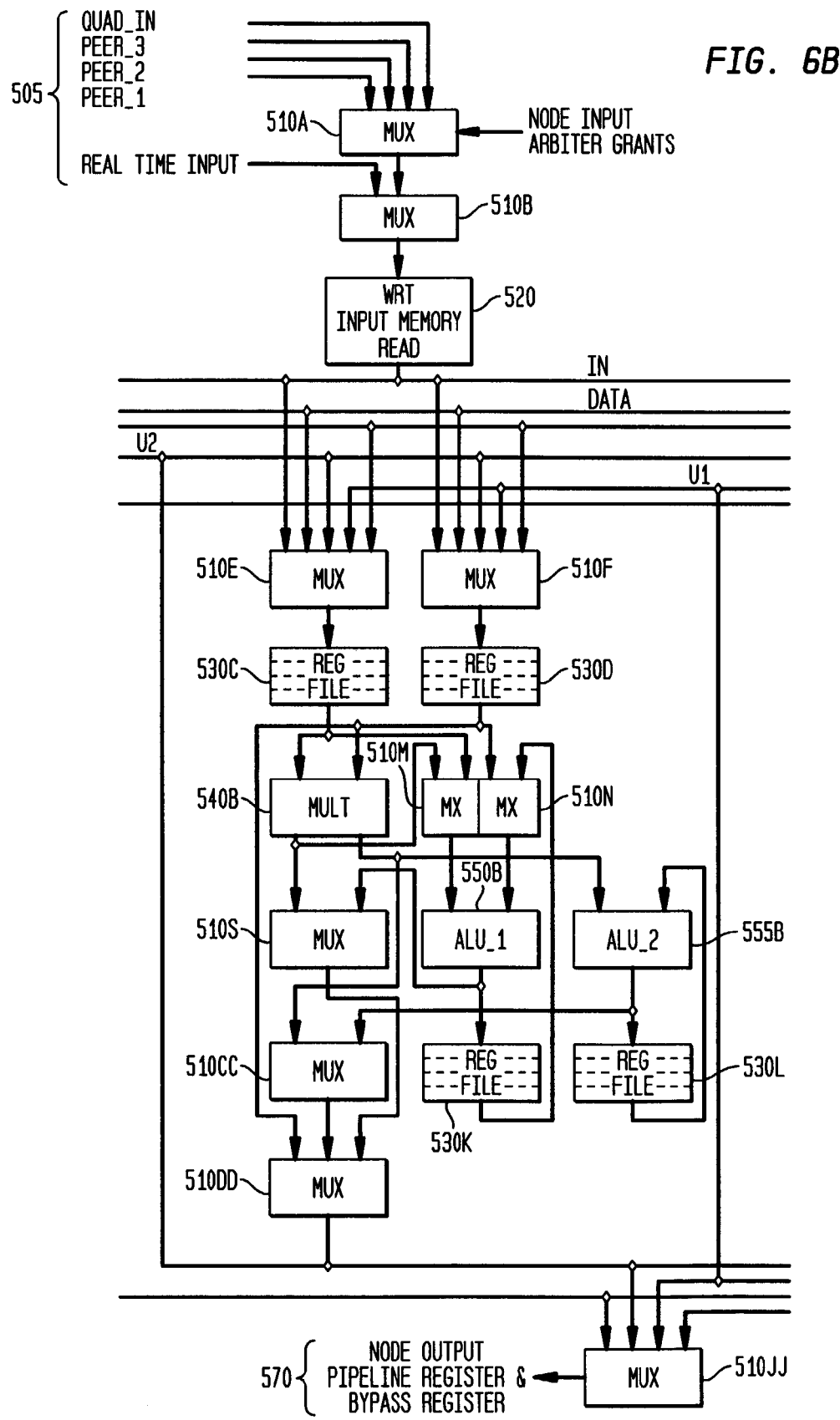
Figure 6C:
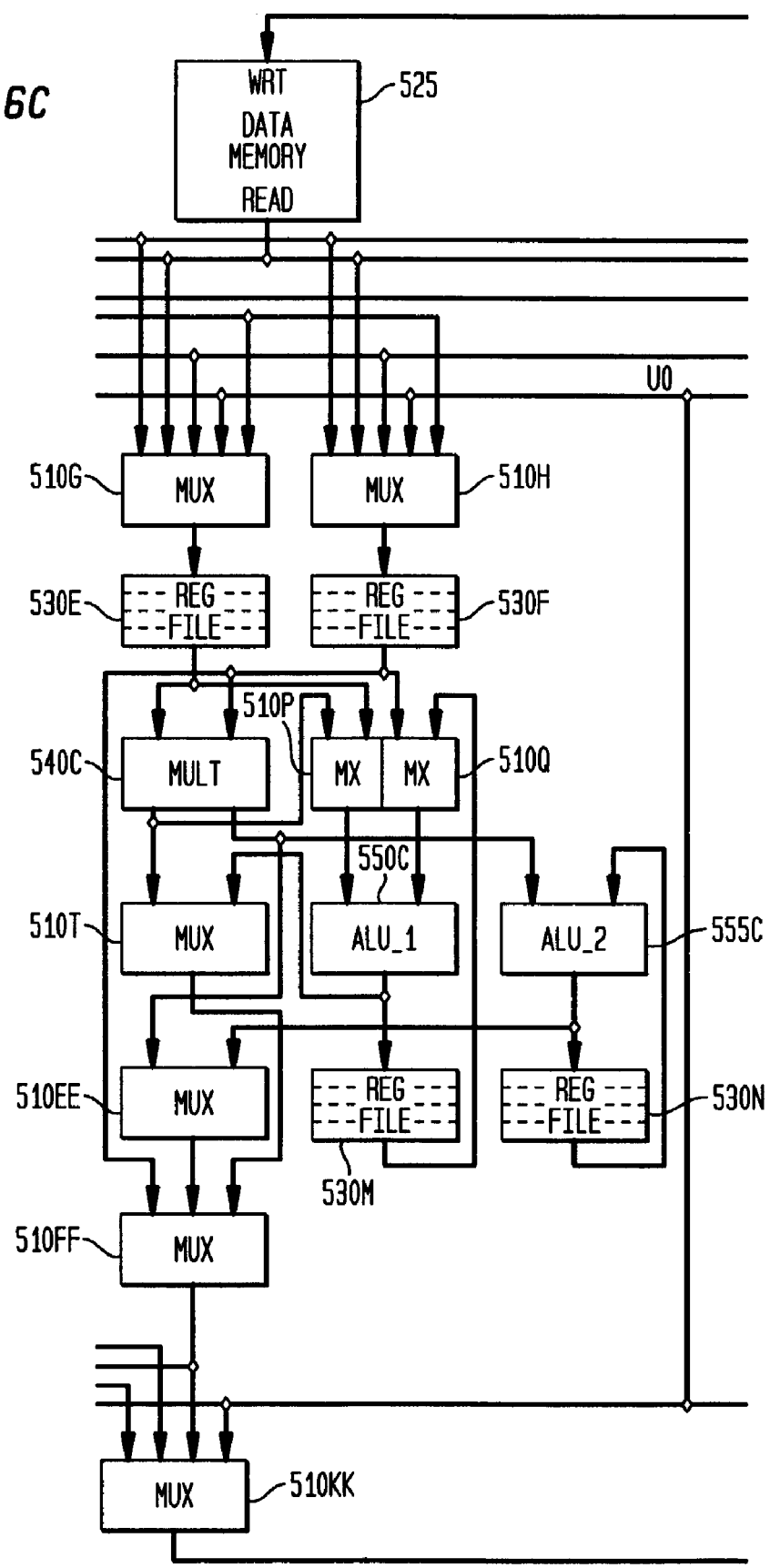
Figure 6D:
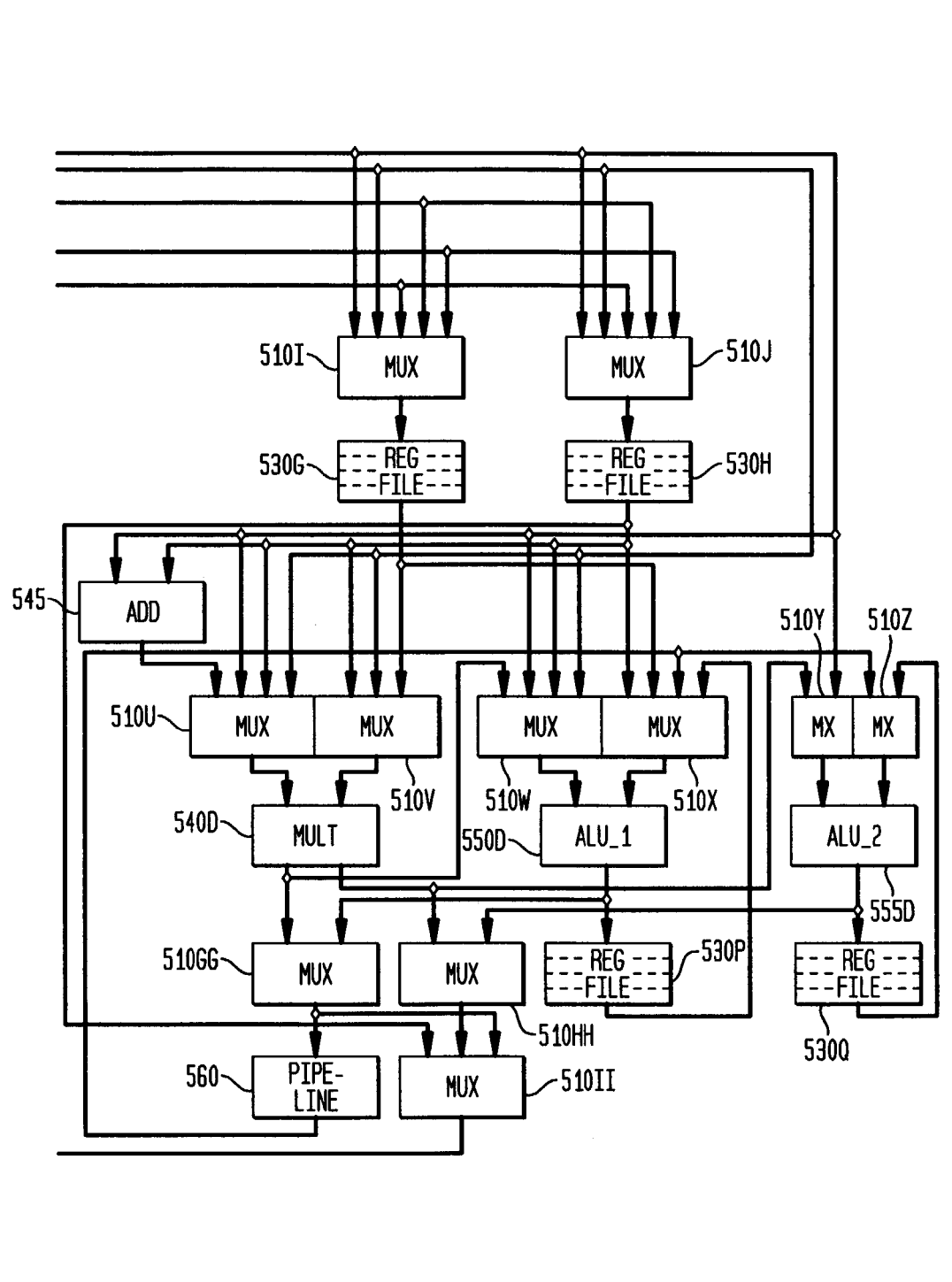

FIG. 6 is a block diagram illustrating, in detail, an exemplary multifunction adaptive computational unit 500 having a plurality of different, fixed computational elements, in accordance with the present invention. When configured accordingly, the adaptive computation unit 500 performs each of the various functions previously illustrated with reference to FIGS. 5A though 5E, plus other functions such as discrete cosine transformation. As illustrated, this multifunction adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
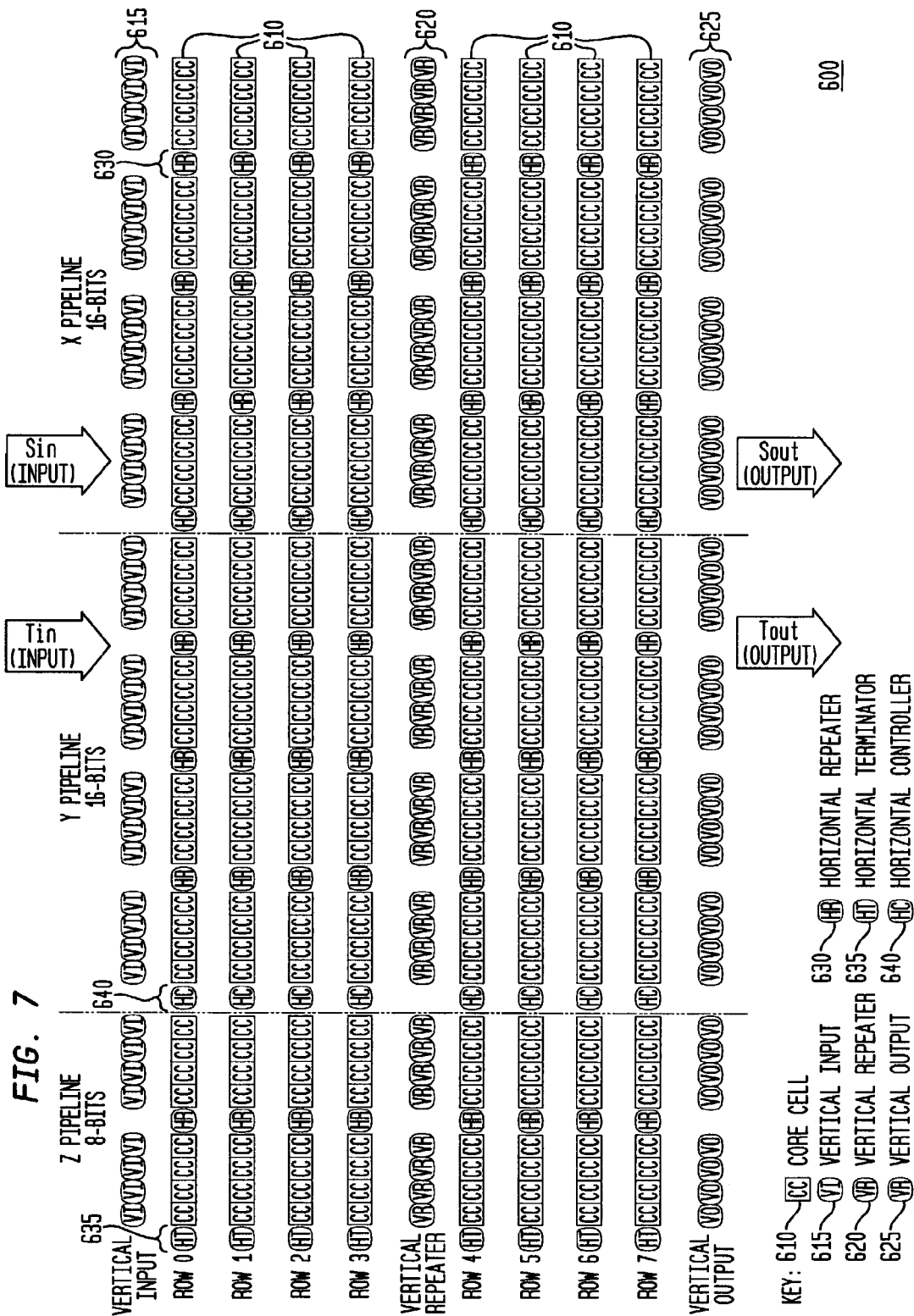
FIG. 7 is a block diagram illustrating, in detail, an adaptive logic processor computational unit having a plurality of fixed computational elements, in accordance with the present invention.

FIG. 7 is a block diagram illustrating, in detail, an exemplary adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
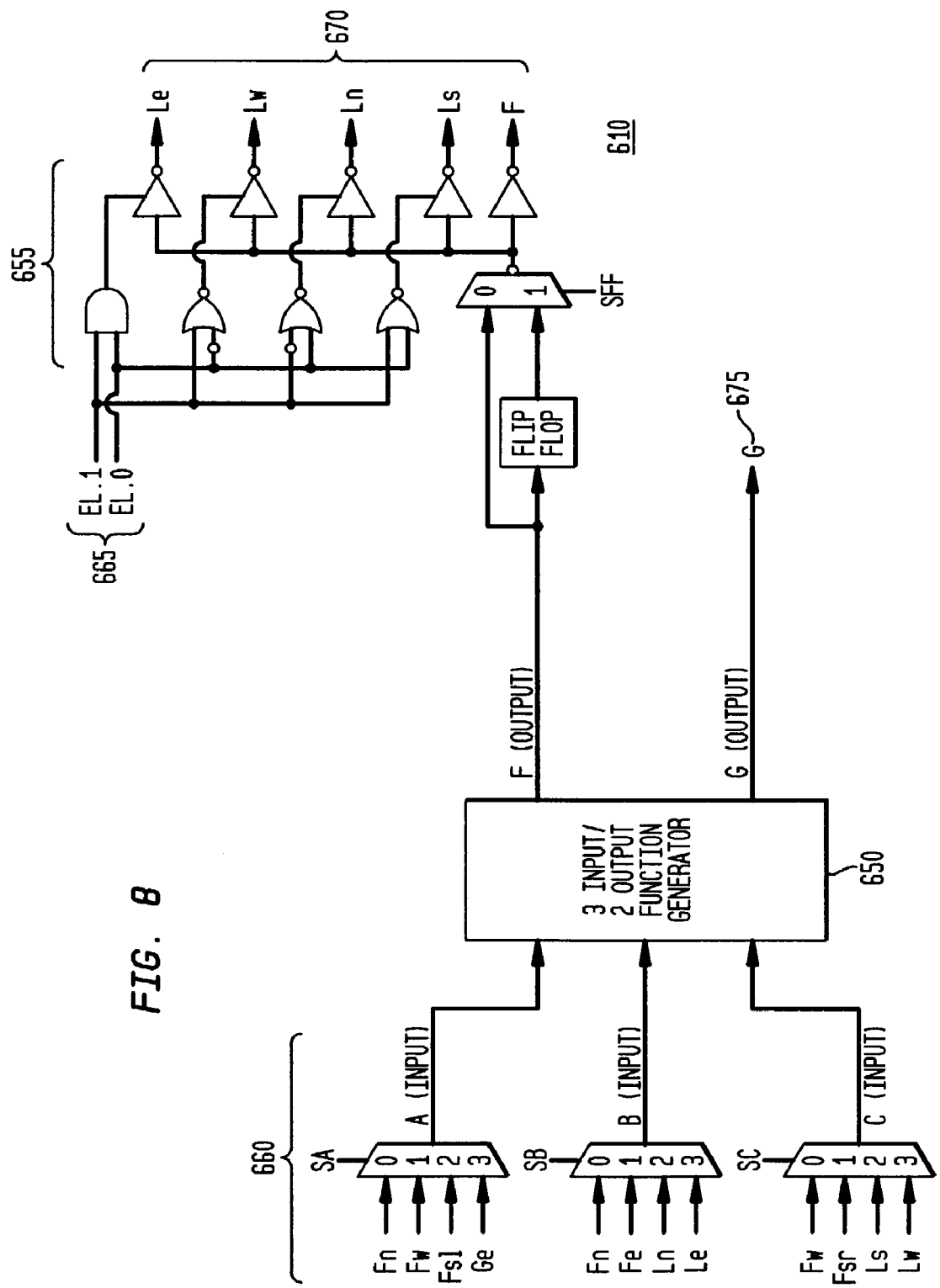
FIG. 8 is a block diagram illustrating, in greater detail, an exemplary core cell of an adaptive logic processor computational unit with a fixed computational element, in accordance with the present invention.

FIG. 8 is a block diagram illustrating, in greater detail, an exemplary core cell 610 of an adaptive logic processor computational unit 600 with a fixed computational element 650, in accordance with the present invention. The fixed computational element is a 3 input—2 output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
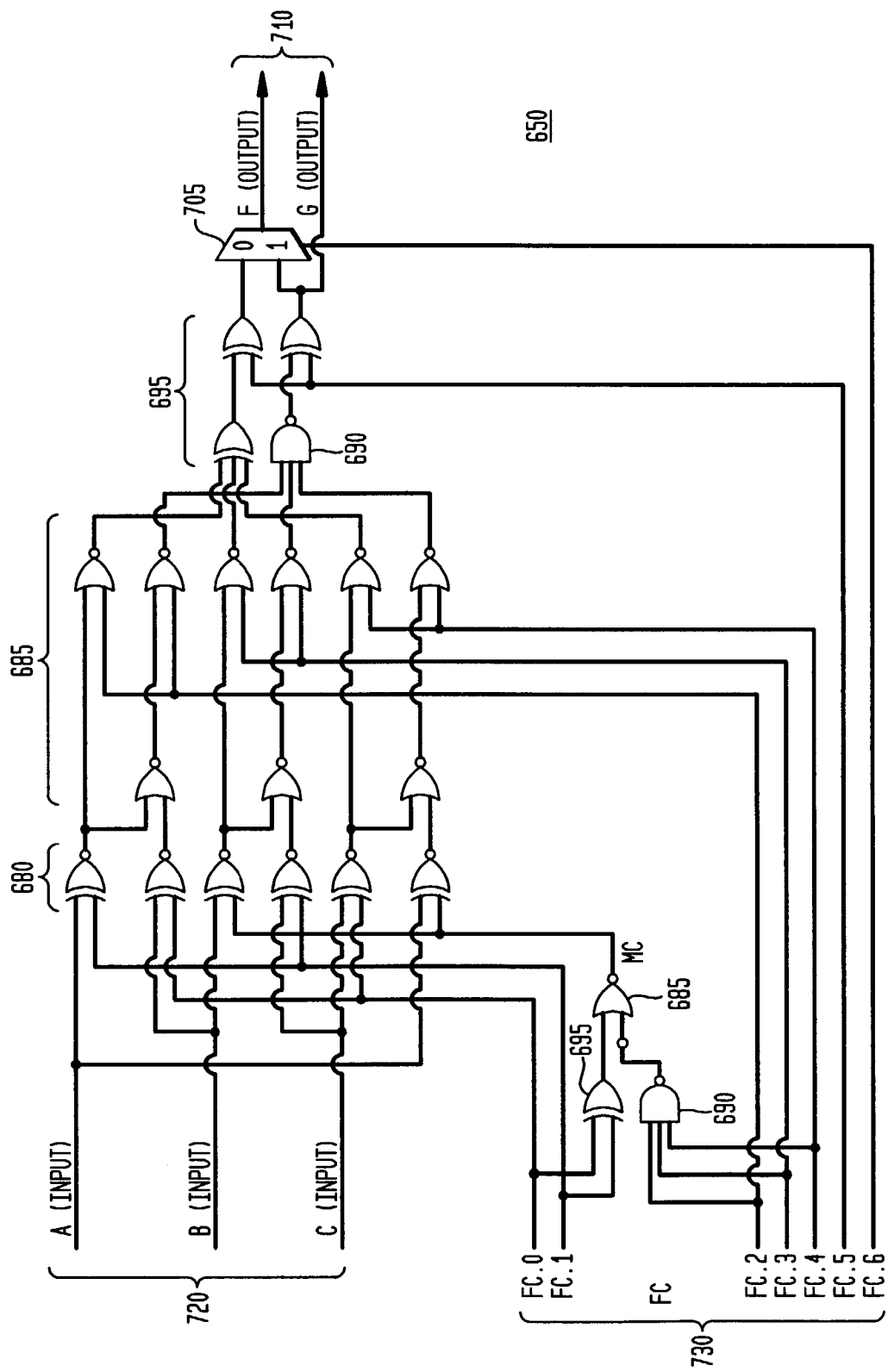
FIG. 9 is a block diagram illustrating, in greater detail, an exemplary fixed computational element of a core cell of an adaptive logic processor computational unit, in accordance with the present invention.

FIG. 9 is a block diagram illustrating, in greater detail, an exemplary fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

Figure 10:
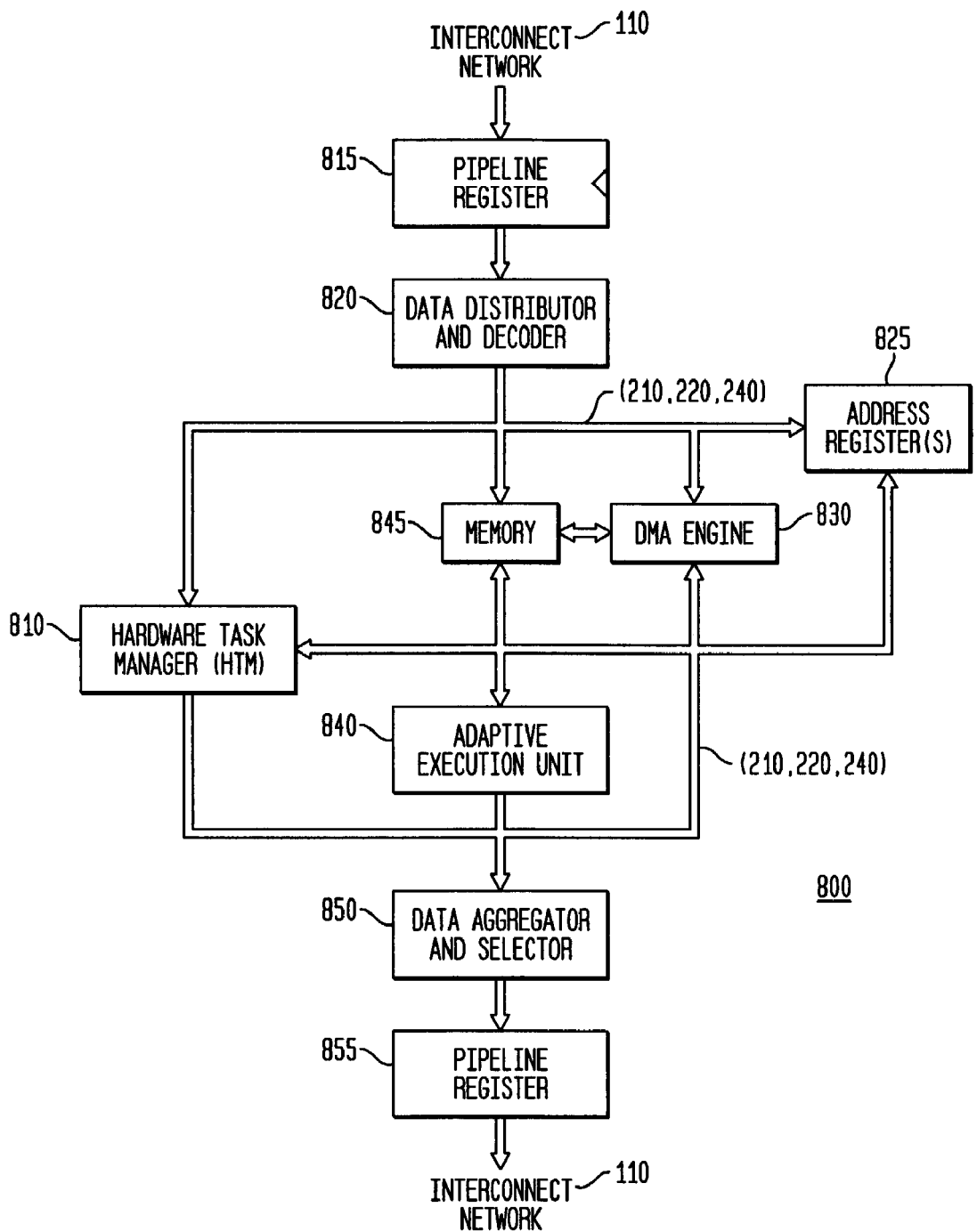
FIG. 10 is a block diagram illustrating a second exemplary apparatus embodiment in accordance with the present invention.

FIG. 10 is a block diagram illustrating a prototypical node or matrix 800 comprising the second apparatus embodiment of the present invention. The node 800 is connected to other nodes 150 within the ACE 100 through the matrix interconnection network 110. The prototypical node 800 includes a fixed (and non-reconfigurable) "node wrapper", an adaptive (reconfigurable) execution unit 840, and a memory 845 (which also may be variable). This fixed and non-reconfigurable "node wrapper" includes an input pipeline register 815, a data decoder and distributor 820, a hardware task manager 810, an address register 825 (optional), a DMA engine 830 (optional), a data aggregator and selector 850, and an output pipeline register 855. These components comprising the node wrapper are generally common to all nodes of the ACE 100, and are comprised of fixed architectures (i.e., application-specific or non-reconfigurable architectures). As a consequence, the node or matrix 800 is a unique blend of fixed, non-reconfigurable node wrapper components, memory, and the reconfigurable components of an adaptive execution unit 840 (which, in turn, are comprised of fixed computational elements and an interconnection network).

Various nodes 800, in general, will have a distinctive and variably-sized adaptive execution unit 840, tailored for one or more particular applications or algorithms, and a memory 845, also implemented in various sizes depending upon the requirements of the adaptive execution unit 840. An adaptive execution unit 840 for a given node 800 will generally be different than the adaptive execution units 840 of the other nodes 800. Each adaptive execution unit 840 is reconfigurable in response to configuration information, and is comprised of a plurality of computation units 200, which are in turn further comprised of a plurality of computational elements 250, and corresponding interconnect networks 210, 220 and 240. Particular adaptive execution units 840 utilized in exemplary embodiments, and the operation of the node 800 and node wrapper, are discussed in greater detail below.

Figure 11:
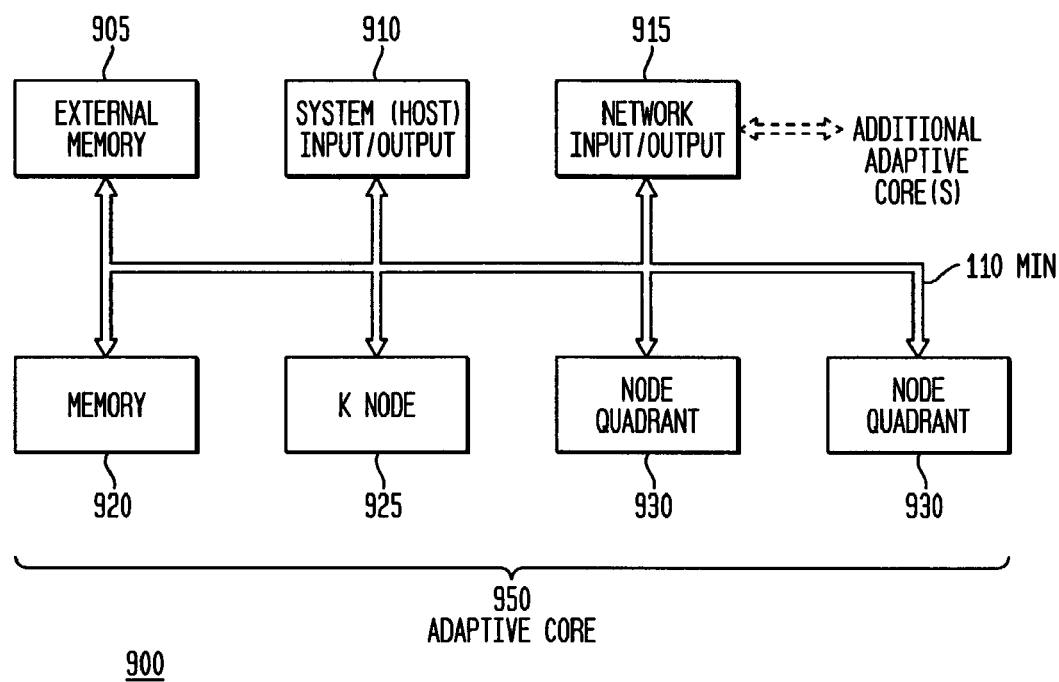
FIG. 11 is a block diagram illustrating an exemplary first system embodiment in accordance with the present invention.

FIG. 11 is a block diagram illustrating a first system embodiment 900 in accordance with the present invention. This first system 900 may be included as part of a larger system or host environment, such as within a computer or communications device, for example. FIG. 11 illustrates a "root" level of such a system 100, where global resources have connectivity (or otherwise may be found). At this root level, the first system 900 includes one or more adaptive cores 950, external (off-IC or off-chip) memory 905 (such as SDRAM), host (system) input and output connections, and network (MIN 110) input and output connections (for additional adaptive cores 950). Each adaptive core 950 includes (on-IC or on-chip) memory 920, a "K-node" 925, and one or more sets of nodes (150, 800) referred to as a node quadrant 930. The K-node 925 (like the kernel controller 150A) provides an operating system for the adaptive core 950.

Generally, each node quadrant 930 consists of 16 nodes in a scalable by-four (×4) fractal arrangement. At this root level, each of these (seven) illustrated elements has total connectivity with all other (six) elements. As a consequence, the output of a root-level element is provided to (and may drive) all other root-level inputs, and the input of each root-level input is provided with the outputs of all other root-level elements. Not separately illustrated, at this root-level of the first system 900, the MIN 110 includes a network with routing (or switching) elements (935), such as round-robin, token ring, cross point switches, or other arbiter elements, and a network (or path) for real time data transfer (or transmission) (such as a data network 240).

Figure 12:
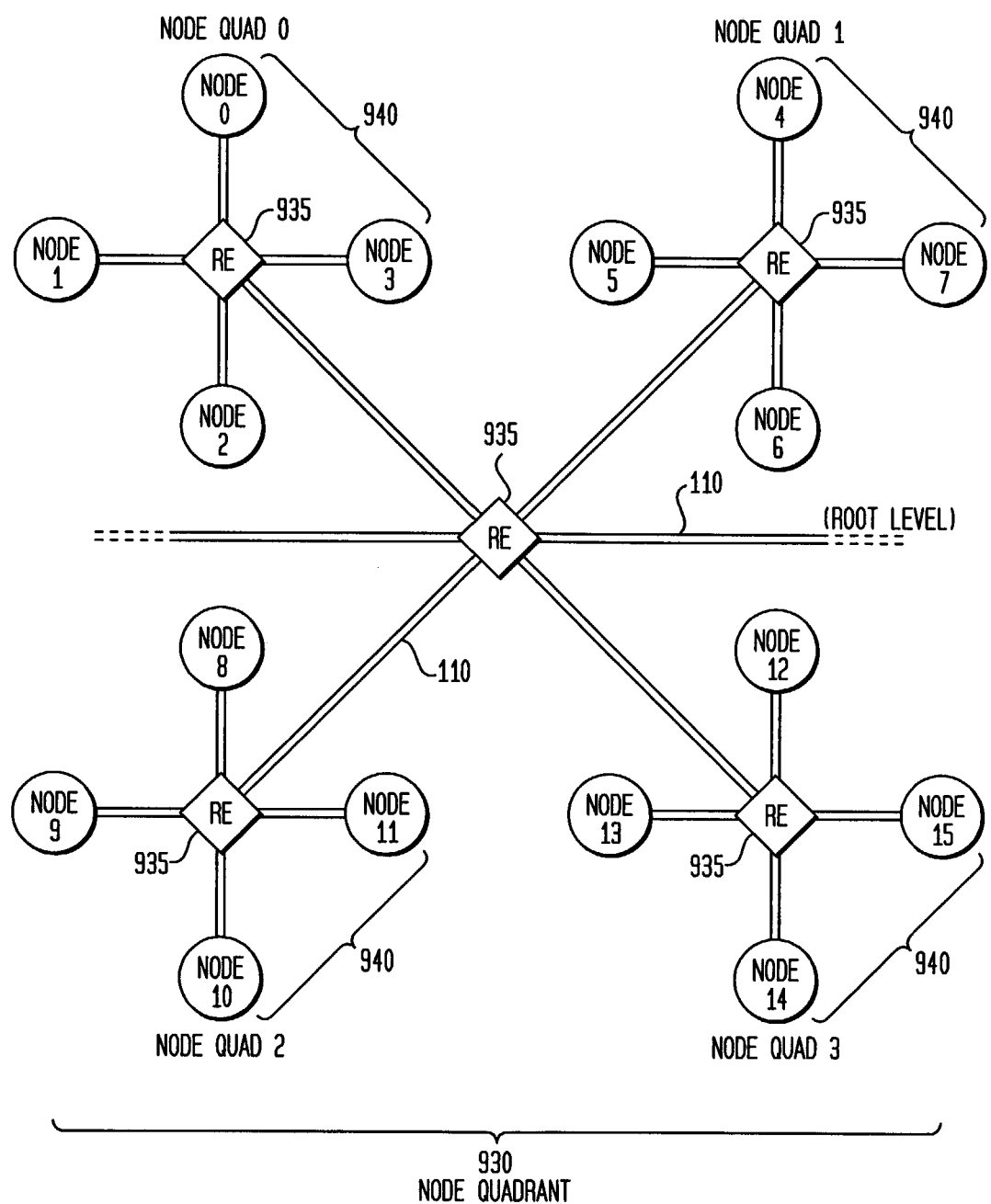
FIG. 12 is a block diagram illustrating an exemplary node quadrant with routing elements in accordance with the present invention.

FIG. 12 is a block diagram illustrating an exemplary node quadrant 930 with routing elements 935 in accordance with the present invention. From the root-level, the node quadrant 930 has a tree topology and consists of 16 nodes (150 or 800), with every four nodes connected as a node "quad" 940 having a routing (or switching) element 935. The routing elements may be implemented variously, such as through round-robin, token ring, cross point switches, (four-way) switching, (¼, ⅓ or ½) arbitration or other arbiter or arbitration elements, or depending upon the degree of control overhead which may be tolerable, through other routing or switching elements such as multiplexers and demultiplexers. This by-four fractal architecture provides for routing capability, scalability, and expansion, without logical limitation. The node quadrant 930 is coupled within the first system 900 at the root-level, as illustrated. This by-four fractal architecture also provides for significant and complete connectivity, with the worst-case distance between any node being $\log_4$ of "k" hops (or number of nodes) (rather than a linear distance), and provides for avoiding the overhead and capacitance of, for example, busses or full crossbar switches.

The node quadrant 930 and node quad 940 structures exhibit a fractal self-similarity with regard to scalability, repeating structures, and expansion. The node quadrant 930 and node quad 940 structures also exhibit a fractal self-similarity with regard to a heterogeneity of the plurality of heterogeneous and reconfigurable nodes 800, heterogeneity of the plurality of heterogeneous computation units 200, and heterogeneity of the plurality of heterogeneous computational elements 250. With regard to the increasing heterogeneity, the adaptive computing integrated circuit 900 exhibits increasing heterogeneity from a first level of the plurality of heterogeneous and reconfigurable matrices, to a second level of the plurality of heterogeneous computation units, and further to a third level of the plurality of heterogeneous computational elements. The plurality of interconnection levels also exhibits a fractal self-similarity with regard to each interconnection level of the plurality of interconnection levels. At increasing depths within the ACE 100, from the matrix 150 level to the computation unit 200 level and further to the computational element 250 level, the interconnection network is increasingly rich, providing an increasing amount of bandwidth and an increasing number of connections or connectability for a correspondingly increased level of reconfigurability. As a consequence, the matrix-level interconnection network, the computation unit-level interconnection network, and the computational element-level interconnection network also constitute a fractal arrangement.

Referring to FIGS. 11 and 12, and as explained in greater detail below, the system embodiment 900 utilizes point-to-point service for streaming data and configuration information transfer, using a data packet (or data structure) discussed below. A packet-switched protocol is utilized for this communication, and in an exemplary embodiment the packet length is limited to a length of 51 bits, with a one word (32 bits) data payload, to obviate any need for data buffering. The routing information within the data packet provides for selecting the particular adaptive core 950, followed by selecting root-level (or not) of the selected adaptive core 950, followed by selecting a particular node (110 or 800) of the selected adaptive core 950. This selection path may be visualized by following the illustrated connections of FIGS. 11 and 12. Routing of data packets out of a particular node may be performed similarly, or may be provided more directly, such as by switching or arbitrating within a node 800 or quad 940, as discussed below.

Figure 13:
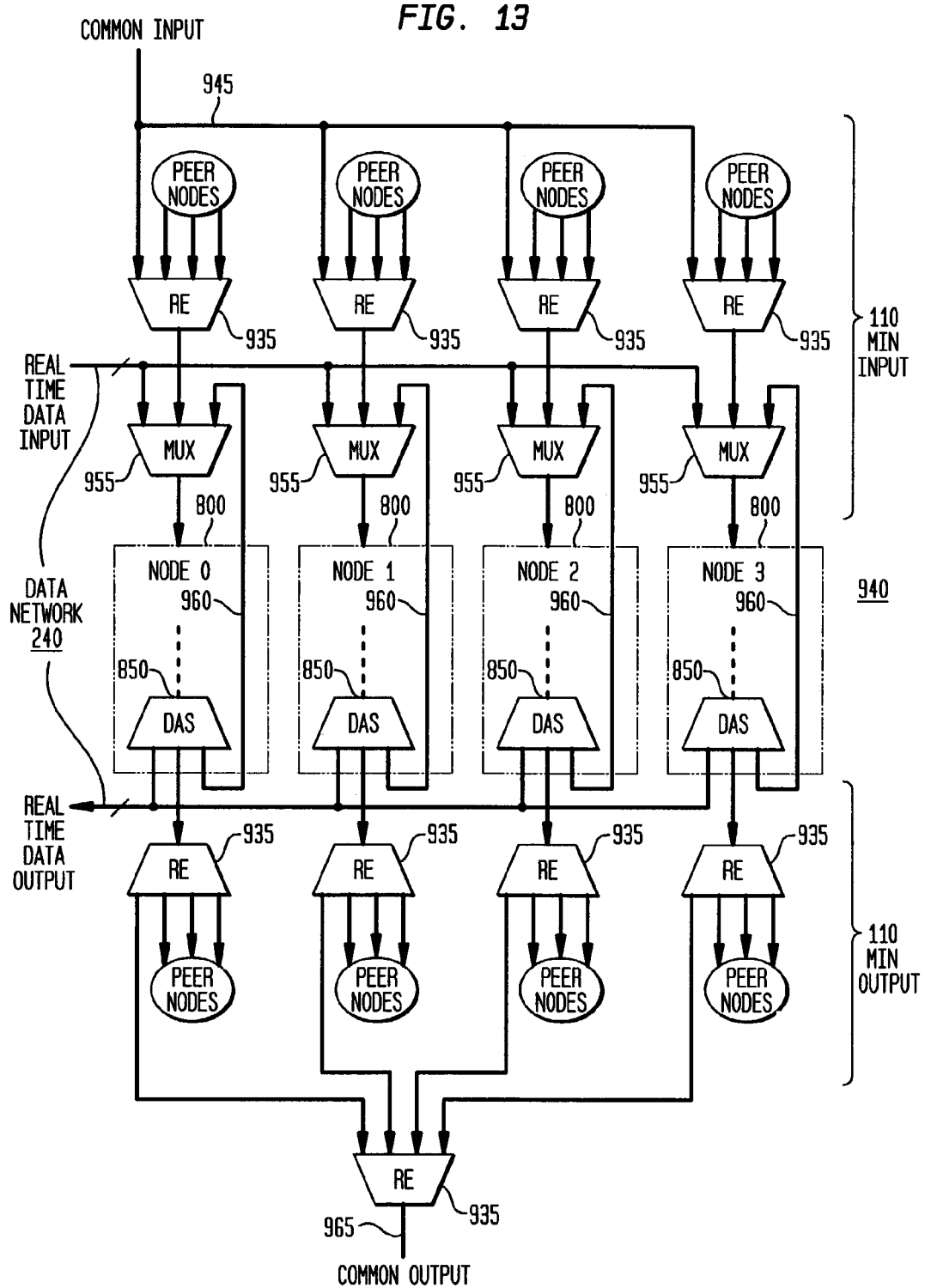
FIG. 13 is a block diagram illustrating exemplary network interconnections in accordance with the present invention.

FIG. 13 is a block diagram illustrating exemplary network interconnections into and out of nodes 800 and node quads 940 in accordance with the present invention. Referring to FIG. 13, MIN 100 connections into a node, via a routing element 935, include a common input 945 (provided to all four nodes 800 within a quad 940), and inputs from the other (three) "peer" nodes within the particular quad 940. For example, outputs from peer nodes 1, 2 and 3 are utilized for input into node 0, and so on. At this level, the routing element 935 may be implemented, for example, as a round-robin, token ring, arbiter, cross point switch, or other four-way switching element. The output from the routing element 935 is provided to a multiplexer 955 (or other switching element) for the corresponding node 800, along with a feedback input 960 from the corresponding node 800, and an input for real time data (from data network 240) (to provide a fast track for input of real time data into nodes 800). The multiplexer 955 (or other switching element) provides selection (switching or arbitration) of one of 3 inputs, namely, selection of input from the selected peer or common 945, selection of input from the same node as feedback, or selection of input of real time data, with the output of the multiplexer 955 provided as the network (MIN 110) input into the corresponding node 800 (via the node's pipeline register 815).

The node 800 output is provided to the data aggregator and selector ("DAS") 850 within the node 800, which determines the routing of output information to the node itself (same node feedback), to the network (MIN 110) (for routing to another node or other system element), or to the data network 240 (for real time data output). When the output information is selected for routing to the MIN 110, the output from the DAS 850 is provided to the corresponding output routing element 935, which routes the output information to peer nodes within the quad 940 or to another, subsequent routing element 935 for routing out of the particular quad 940 through a common output 965 (such for routing to another node quad 940, node quadrant 930, or adaptive core 950).

Figure 14:
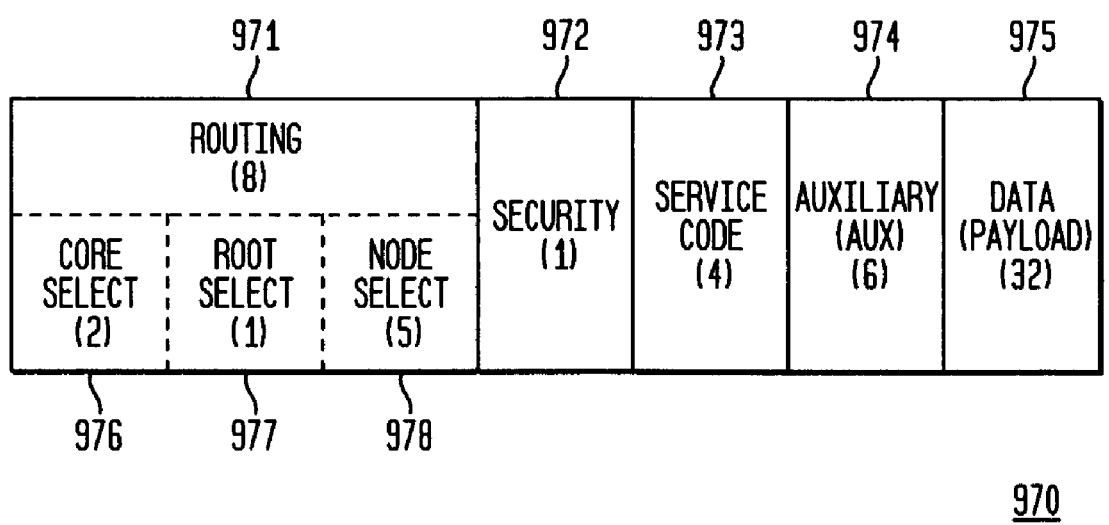
FIG. 14 is a block diagram illustrating an exemplary data structure embodiment in accordance with the present invention.

FIG. 14 is a block diagram illustrating an exemplary data structure embodiment in accordance with the present invention. The system embodiment 900 utilizes point-to-point data and configuration information transfer, using a data packet (as an exemplary data structure) 970, and may be considered as an exemplary form of "silverware", as previously described herein. The exemplary data packet 970 provides for 51 bits per packet, with 8 bits provided for a routing field (971), 1 bit for a security field (972), 4 bits for a service code field (973), 6 bits for an auxiliary field (974), and 32 bits (one word length) for data (as a data payload or data field) (975). As indicated above, the routing field 971 may be further divided into fields for adaptive core selection (976), root selection (977), and node selection (978). In this selected 51-bit embodiment, up to four adaptive cores may be selected, and up to 32 nodes per adaptive core. As the packet is being routed, the routing bits may be stripped from the packet as they are being used in the routing process. The service code field 973 provides for designations such as point-to-point inter-process communication, acknowledgements for data flow control, "peeks" and "pokes" (as coined terminology referring to reads and writes by the K-node into memory 845), DMA operations (for memory moves), and random addressing for reads and writes to memory 845. The auxiliary (AUX) field 974 supports up to 32 streams for any of up to 32 tasks for execution on the adaptive execution unit 840, as discussed below, and may be considered to be a configuration information payload. The one word length (32-bit) data payload is then provided in the data field 975. The exemplary data structure 970 (as a data packet) illustrates the interdigitation of data and configuration/control information, as discussed above.

Referring to FIG. 10, in light of the first system 900 structure and data structure discussed above, the node 800 architecture of the second apparatus embodiment may be described in more detail. The input pipeline register 815 is utilized to receive data and configuration information from the network interconnect 110. Preferably, the input pipeline register 815 does not permit any data stalls. More particularly, in accordance with the data flow modeling of the present invention, the input pipeline register 815 should accept new data from the interconnection network 110 every clock period; consequently, the data should also be consumed as it is produced. This imposes the requirement that any contention issues among the input pipeline register 815 and other resources within the node 800 be resolved in favor of the input pipeline register 815, i.e., input data in the input pipeline register has priority in the selection process implemented in various routing (or switching) elements 935, multiplexers 955, or other switching or arbitration elements which may be utilized.

The data decoder and distributor 820 interfaces the input pipeline register 815 to the various memories (e.g., 845) and registers (e.g., 825) within the node 800, the hardware task manager 810, and the DMA engine 830, based upon the values in the service and auxiliary fields of the 51-bit data structure. The data decoder 820 also decodes security, service, and auxiliary fields of the 51-bit network data structure (of the configuration information or of operand data) to direct the received word to its intended destination within the node 800.

Conversely, data from the node 800 to the network (MIN 110 or to other nodes) is transferred via the output pipeline register 855, which holds data from one of the various memories (845) or registers (e.g., 825 or registers within the adaptive execution unit 840) of the node 800, the adaptive execution unit 840, the DMA engine 830, and/or the hardware task manager 810. Permission to load data into the output pipeline register 855 is granted by the data aggregator and selector (DAS) 850, which arbitrates or selects between and among any competing demands of the various (four) components of the node 800 (namely, requests from the hardware task manager 810, the adaptive execution unit 840, the memory 845, and the DMA engine 830). The data aggregator and selector 850 will issue one and only one grant whenever there is one or more requests and the output pipeline register 855 is available. In the selected embodiment, the priority for issuance of such a grant is, first, for K-node peek (read) data; second, for the adaptive execution unit 840 output data; third, for source DMA data; and fourth, for hardware task manager 810 message data. The output pipeline register 855 is available when it is empty or when its contents will be transferred to another register at the end of the current clock cycle.

The DMA engine 830 of the node 800 is an optional component. In general, the DMA engine 830 will follow a five register model, providing a starting address register, an address stride register, a transfer count register, a duty cycle register, and a control register. The control register within the DMA engine 830 utilizes a GO bit, a target node number and/or port number, and a DONE protocol. The K-node 925 writes the registers, sets the GO bit, and receives a DONE message when the data transfer is complete. The DMA engine 830 facilitates block moves from any of the memories of the node 800 to another memory, such as an on-chip bulk memory, external SDRAM memory, another node's memory, or a K-node memory for diagnostics and/or operational purposes. The DMA engine 830, in general, is controlled by the K-node 925.

The hardware task manager 810 is configured and controlled by the K-node 925 and interfaces to all node components except the DMA engine 830. The hardware task manager 810 executes on each node 800, processing a task list and producing a task ready-to-run queue implemented as a first in—first out (FIFO) memory. The hardware task manager 810 has a top level finite state machine that interfaces with a number of subordinate finite state machines that control the individual hardware task manager components. The hardware task manager 810 controls the configuration and reconfiguration of the computational elements 250 within the adaptive execution unit 840 for the execution of any given task by the adaptive execution unit 840.

The K-node 925 initializes the hardware task manager 810 and provides it with set up information for the tasks needed for a given operating mode, such as operating as a communication processor or an MP3 player. The K-node 925 provides configuration information as stored tasks (i.e., stored tasks or programs) within memory 845 and within local memory within the adaptive execution unit 840. The K-node 925 initializes the hardware task manager 810 (as a parameter table) with designations of input ports, output ports, routing information, the type of operations (tasks) to be executed (e.g., FFT, DCT), and memory pointers. The K-node 925 also initializes the DMA engine 830.

The hardware task manager 810 maintains a port translation table and generates addresses for point-to-point data delivery, mapping input port numbers to a current address of where incoming data should be stored in memory 845. The hardware task manager 810 provides data flow control services, tracking both production and consumption of data, using corresponding production and consumption counters, and thereby determines whether a data buffer is available for a given task. The hardware task manager 810 maintains a state table for tasks and, in the selected embodiment, for up to 32 tasks. The state table includes a GO bit (which is enabled or not enabled (suspended) by the K-node 925), a state bit for the task (idle, ready-to-run, run (running)), an input port count, and an output port count (for tracking input data and output data). In the selected embodiment, up to 32 tasks may be enabled at a given time. For a given enabled task, if its state is idle, and if sufficient input data (at the input ports) are available and sufficient output ports are available for output data, its state is changed to ready-to-run and queued for running (transferred into a ready-to-run FIFO or queue). Typically, the adaptive execution unit 840 is provided with configuration information (or code) and two data operands (x and y).

From the ready-to-run queue, the task is transferred to an active task queue, the adaptive execution unit 840 is configured for the task (set up), the task is executed by the adaptive execution unit 840, and output data is provided to the data aggregator and selector 850. Following this execution, the adaptive execution unit 840 provides an acknowledgement message to the hardware task manager 810, requesting the next item. The hardware task manager 810 may then direct the adaptive execution unit 840 to continue to process data with the same configuration in place, or to tear down the current configuration, acknowledge completion of the tear down and request the next task from the ready-to-run queue. Once configured for execution of a selected algorithm, new configuration information is not needed from the hardware task manager 810, and the adaptive execution unit 840 functions effectively like an ASIC, with the limited additional overhead of acknowledgement messaging to the hardware task manager 810. These operations are described in additional detail below.

A module is a self-contained block of code (for execution by a processor) or a hardware-implemented function (embodied as configured computational elements 250), which is processed or performed by an execution unit 840. A task is an instance of a module, and has four states: suspend, idle, ready or run. A task is created by associating the task to a specific module (computational elements 250) on a specific node 800; by associating physical memories and logical input buffers, logical output buffers, logical input ports and logical output ports of the module; and by initializing configuration parameters for the task. A task is formed by the K-node writing the control registers in the node 800 where the task is being created (i.e., enabling the configuration of computational elements 250 to perform the task), and by the K-node writing to the control registers in other nodes, if any, that will be producing data for the task and/or consuming data from the task. These registers are memory mapped into the K-node's address space, and "peek and poke" network services are used to read and write these values. A newly created task starts in the "suspend" state.

Once a task is configured, the K-node can issue a "go" command, setting a bit in a control register in the hardware task manager 810. The action of this command is to move the task from the "suspend" state to the "idle" state. When the task is "idle" and all its input buffers and output buffers are available, the task is added to the "ready-torun" queue which is implemented as a FIFO; and the task state is changed to "ready/run". Buffers are available to the task when subsequent task execution will not consume more data than is present in its input buffers or will not produce more data than there is capacity in its output buffers.

When the adaptive execution unit 840 is not busy and the FIFO is not empty, the task number for the next task that is ready to execute is removed from the FIFO, and the state of this task is "run". In the "run" state, the task (executed by the configured adaptive execution unit 840) consumes data from its input buffers and produces data for its output buffers.

The adaptive execution units 840 will vary depending upon the type of node 800 implemented. Various adaptive execution units 840 may be specifically designed and implemented for use in heterogeneous nodes 800, for example, for a programmable RISC processing node; for a programmable DSP node; for an adaptive or reconfigurable node for a particular domain, such as an arithmetic node; and for an adaptive bit-manipulation unit (RBU). Various adaptive execution units 840 are discussed in greater detail below.

For example, a node 800, through its execution unit 840, will perform an entire algorithmic element in a comparatively few clock cycles, such as one or two clock cycles, compared to performing a long sequence of separate operations, loads/stores, memory fetches, and so on, over many hundreds or thousands of clock cycles, to eventually achieve the same end result. Through its computational elements 250, the execution unit 840 may then be reconfigured to perform another, different algorithmic element. These algorithmic elements are selected from a plurality of algorithmic elements comprising, for example: a radix-2 Fast Fourier Transformation (FFT), a radix-4 Fast Fourier Transformation (FFT), a radix-2 Inverse Fast Fourier Transformation (IFFT), a radix-4 Inverse Fast Fourier Transformation (IFFT), a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation.

In an exemplary embodiment, a plurality of different nodes 800 are created, by varying the type and amount of computational elements 250 (forming computational units 200), and varying the type, amount and location of interconnect (with switching or routing elements) which form the execution unit 840 of each such node 800. In the exemplary embodiment, two different nodes 800 perform, generally, arithmetic or mathematical algorithms, and are referred to as adaptive (or reconfigurable) arithmetic nodes (AN), as AN1 and AN2. For example, the AN1 node, as a first node 800 of the plurality of heterogeneous and reconfigurable nodes, comprises a first selection of computational elements 250 from the plurality of heterogeneous computational elements to form a first reconfigurable arithmetic node for performance of Fast Fourier Transformation (FFT) and Discrete Cosine Transformation (DCT). Continuing with the example, the AN2 node, as a second node 800 of the plurality of heterogeneous and reconfigurable nodes, comprises a second selection of computational elements 250 from the plurality of heterogeneous computational elements to form a second reconfigurable arithmetic node, the second selection different than the first selection, for performance of at least two of the following algorithmic elements: multi-dimensional Discrete Cosine Transformation (DCT), finite impulse response (FIR) filtering, OVSF code generation, Haddamard Transformation, bit-wise WCDMA Turbo interleaving, WCDMA uplink concatenation, WCDMA uplink repeating, and WCDMA uplink real spreading and gain scaling.

Also in the exemplary embodiment, a plurality of other types of nodes 800 are defined, such as, for example:

A bit manipulation node, as a third node of the plurality of heterogeneous and reconfigurable nodes, comprising a third selection of computational elements 250 from the plurality of heterogeneous computational elements, the third selection different than the first selection, for performance of at least two of the following algorithmic elements: variable and multiple rate convolutional encoding, scrambling code generation, puncturing, interleaving, modulation mapping, complex multiplication, Viterbi algorithm, Turbo encoding, Turbo decoding, correlation, linear feedback shifting, downlink despreading, uplink spreading, CRC encoding, de-puncturing, and de-repeating.

A reconfigurable filter node, as a fourth node of the plurality of heterogeneous and reconfigurable nodes, comprising a fourth selection of computational elements 250 from the plurality of heterogeneous computational elements, the fourth selection different than the first selection, for performance of at least two of the following algorithmic elements: adaptive finite impulse response (FIR) filtering, Griffith's LMS algorithm, and RRC filtering.

A reconfigurable finite state machine node, as a fifth node of the plurality of heterogeneous and reconfigurable nodes, comprising a fifth selection of computational elements 250 from the plurality of heterogeneous computational elements, the fifth selection different than the first selection, for performance of at least two of the following processes: control processing; routing data and control information between and among the plurality of heterogeneous computational elements 250; directing and scheduling the configuration of the plurality of heterogeneous computational elements for performance of a first algorithmic element and the reconfiguration of the plurality of heterogeneous computational elements for performance of a second algorithmic element; timing and scheduling the configuration and reconfiguration of the plurality of heterogeneous computational elements with corresponding data; controlling power distribution to the plurality of heterogeneous computational elements and the interconnection network; and selecting the first configuration information and the second configuration information from a singular bit stream comprising data commingled with a plurality of configuration information.

A reconfigurable multimedia node, as a sixth node of the plurality of heterogeneous and reconfigurable nodes, comprising a sixth selection of computational elements 250 from the plurality of heterogeneous computational elements, the sixth selection different than the first selection, for performance of at least two of the following algorithmic elements: radix-4 Fast Fourier Transformation (FFT); multi-dimensional radix-2 Discrete Cosine Transformation (DCT); Golay correlation; adaptive finite impulse response (FIR) filtering;

Griffith's LMS algorithm; and RRC filtering.

A reconfigurable hybrid node, as a seventh node of the plurality of heterogeneous and reconfigurable nodes, comprising a seventh selection of computational elements 250 from the plurality of heterogeneous computational elements, the seventh selection different than the first selection, for performance of arithmetic functions and bit manipulation functions.

A reconfigurable input and output (I/O) node, as an eighth node of the plurality of heterogeneous and reconfigurable nodes, comprising an eighth selection of computational elements 250 from the plurality of heterogeneous computational elements, the eighth selection different than the first selection, for adaptation of input and output functionality for a plurality of types of I/O standards, the plurality of types of I/O standards comprising standards for at least two of the following: PCI busses, Universal Serial Bus types one and two (USB1 and USB2), and small computer systems interface (SCSI).

A reconfigurable operating system node, as a ninth node of the plurality of heterogeneous and reconfigurable nodes, comprising a ninth selection of computational elements 250 from the plurality of heterogeneous computational elements, the ninth selection different than the first selection, for storing and executing a selected operating system of a plurality of operating systems.

FIG. 15 is a block diagram illustrating a second system embodiment 1000 in accordance with the present invention. The second system embodiment 1000 is comprised of a plurality of variably-sized nodes (or matrices) 1010 (illustrated as nodes 1010A through 1010X), with the illustrated size of a given node 1010 also indicative of an amount of computational elements 250 within the node 1010 and an amount of memory included within the node 1010 itself. The nodes 1010 are coupled to an interconnect network 110, for configuration, reconfiguration, routing, and so on, as discussed above. The second system embodiment 1000 illustrates node 800 and system configurations which are different and more varied than the quadrant 930 and quad 940 configurations discussed above.

As illustrated, the second system embodiment 1000 is designed for use with other circuits within a larger system and, as a consequence, includes configurable input/output (I/O) circuits 1025, comprised of a plurality of heterogeneous computational elements configurable (through corresponding interconnect, not separately illustrated) for I/O functionality. The configurable input/output (I/O) circuits 1025 provide connectivity to and communication with a system bus (external), external SDRAM, and provide for real time inputs and outputs. A K-node (KARC) 1050 provides the K-node (KARC) functionality discussed above. The second system embodiment 1000 further includes memory 1030 (as on-chip RAM, with a memory controller), and a memory controller 1035 (for use with the external memory (SDRAM)). Also included in the apparatus 1000 are an aggregator/formatter 1040 and a de-formatter/distributor 1045, providing functions corresponding to the functions of the data aggregator and selector 850 and data distributor and decoder 820, respectively, but for the larger system 1000 (rather than within a node 800).

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), creates an entirely new class or category of integrated circuit, which may be referred to as an adaptive computing architecture. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable or adaptive in real time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Other advantages of the present invention may be further apparent to those of skill in the art. For mobile communications, for example, hardware acceleration for one or two algorithmic elements has typically been confined to infrastructure base stations, handling many (typically 64 or more) channels. Such an acceleration may be cost justified because increased performance and power savings per channel, performed across multiple channels, results in significant performance and power savings. Such multiple channel performance and power savings are not realizable, using prior art hardware acceleration, in a single operative channel mobile terminal (or mobile unit). In contrast, however, through use of the present invention, cost justification is readily available, given increased performance and power savings, because the same IC area may be configured and reconfigured to accelerate multiple algorithmic tasks, effectively generating or bringing into existence a new hardware accelerator for each next algorithmic element.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in real time, and is capable of having corresponding, multiple modes of operation. In addition, through the selection of particular functions for reconfigurable acceleration, the ACE 100 minimizes power consumption and is suitable for low power applications, such as for use in hand-held and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. An integrated circuit, comprising:
 a first plurality of computational elements, at least one computational element of the first plurality of computational elements having a fixed architecture;
 a first interconnection network coupled to the first plurality of computational elements and adapted to configure the first plurality of computational elements for a first data operation of a plurality of data operations, in response to first configuration information;
 a first memory element coupled to the first interconnection network and adapted to store the first configuration information;
 a second plurality of computational elements, at least one computational element of the second plurality of computational elements having a fixed architecture;
 a second interconnection network coupled to the second plurality of computational elements arid adapted to configure the second plurality of computational elements for a second data operation of the plurality of data operations, in response to second configuration information;

a second memory element coupled to the second interconnection network and adapted to store the second configuration information;

a processor element; and a third interconnection network adapted to selectively transfer data or control between or among the first and second pluralities of computational elements and the processor element.

2. The integrated circuit of claim 1, wherein the first interconnection network is further adapted to reconfigure the first plurality of computational elements in response to third configuration information and the second interconnection network is further adapted to reconfigure the second plurality of computational elements in response to fourth configuration information.

3. The integrated circuit of claim 1, wherein the processor element is a reduced instruction set (RISC) processor, a digital signal processor, a microprocessor, or a finite state machine.

4. The integrated circuit of claim 1, wherein the first and second configuration information are stored as corresponding tables in the first and second memory elements, respectively.

5. The integrated circuit of claim 1, wherein the first and second pluralities of computational elements further comprise different pluralities of fixed and differing computational elements.

6. The integrated circuit of claim 1, wherein the first and second pluralities of computational elements further comprise at least one non-fixed or internally configurable computational element.

7. The integrated circuit of claim 6, wherein the at least one configurable computational element further comprises a configurable gate array, a configurable function array, or a configurable logic block.

8. The integrated circuit of claim 1, further comprising:
a configuration network adapted to selectively transfer the first and second configuration information to the first and second memory elements, respectively.

9. The integrated circuit of claim 8, wherein the configuration network is a serial bus.

10. The integrated circuit of claim 1, further comprising:
a configuration network adapted to selectively transfer the first and second configuration information to the first and second interconnection networks, respectively.

11. The integrated circuit of claim 1, wherein the third interconnection network is further adapted to selectively and respectively transfer the first and second configuration information to the first and second pluralities of computational elements, to the first and second interconnection networks, or to the first and second memory elements.

12. The integrated circuit of claim 1, wherein the third interconnection network is indirectly coupled to the first and second pluralities of computational elements through the respective first and second interconnection networks.

13. The integrated circuit of claim 12, wherein the third interconnection network is adapted to selectively transfer data or control to or from the first or second pluralities of computational elements through the respective first and second interconnection networks.

14. The integrated circuit of claim 1, wherein the first, second and third interconnection networks further comprise a plurality of switching elements adapted to selectively circuit switch data to or from the first and second pluralities of computational elements.

15. The integrated circuit of claim 14, wherein the plurality of switching elements comprises multiplexers or demultiplexers.

16. The integrated circuit of claim 14, wherein the plurality of switching elements are adapted to couple selected data outputs and selected data inputs of the first or second pluralities of computational elements and to maintain the data output and data input couplings until a subsequent reconfiguration of the first, second or third interconnection networks.

17. The integrated circuit of claim 1, wherein the third interconnection network is further adapted to selectively route a plurality of data packets to the first and second pluralities of computational elements using a corresponding address field of each data packet.

18. An integrated circuit, comprising:
pluralities of fixed and differing computational elements; and
a hierarchical interconnection network comprising a first interconnection network and a plurality of second interconnection networks, the first interconnection network adapted to selectively transfer data or control between or among the pluralities of fixed and differing computational elements, and each second interconnection network of the plurality of second interconnection networks coupled to a corresponding plurality of fixed and differing computational elements and adapted to independently configure the corresponding plurality of fixed and differing computational elements, in response to corresponding configuration information, for a corresponding data operation of a plurality of data operations.

19. The integrated circuit of claim 18, wherein each second interconnection network is further adapted to reconfigure the corresponding plurality of fixed and differing computational elements for a different data operation in response to additional corresponding configuration information.

20. The integrated circuit of claim 18, wherein at least two of the pluralities of fixed and differing computational elements comprise different arrays of fixed and differing computational elements.

21. The integrated circuit of claim 18, further comprising:
a processor element coupled to the first interconnection network, wherein the processor element is a reduced instruction set (RISC) processor, a digital signal processor, a microprocessor, or a finite state machine.

22. The integrated circuit of claim 18, further comprising:
a plurality of memory elements, a corresponding memory element of the plurality of memory elements coupled to a corresponding second interconnection network and adapted to store corresponding configuration information as a look up table.

23. The integrated circuit of claim 22, further comprising:
a configuration bus adapted to selectively transfer corresponding configuration information to the corresponding memory element.

24. The integrated circuit of claim 22, wherein the first interconnection network is further adapted to selectively transfer corresponding configuration information to the corresponding memory element.

25. The integrated circuit of claim 18, wherein the first interconnection network is indirectly coupled to the pluralities of fixed and differing computational elements through the corresponding second interconnection networks.

26. The integrated circuit of claim 18, wherein the first and second interconnection networks further comprise a plurality of switching elements adapted to selectively circuit switch data to or from the pluralities of fixed and differing computational elements.

27. The integrated circuit of claim 26, wherein the plurality of switching elements comprise multiplexers or demultiplexers.

28. The integrated circuit of claim 26, wherein the plurality of switching elements are adapted to couple selected data outputs and selected data inputs of the first or second pluralities of computational elements and to maintain the data output and data input couplings until a subsequent reconfiguration of the first, second or third interconnection networks.

29. The integrated circuit of claim 18, wherein the first interconnection network is further adapted to selectively route a plurality of discrete data packets to the pluralities of fixed and differing computational elements using a corresponding address field of each data packet.

30. The integrated circuit of claim 18, wherein at least one computational element of the pluralities of fixed and differing computational elements is parameterizable.

31. A method of operating the integrated circuit of claim 18, comprising:
in response to first corresponding configuration information and through a corresponding second interconnection network, configuring a first plurality of computational elements of the pluralities of fixed and differing computational elements for performance of a first corresponding data operation of the plurality of data operations;
in response to second corresponding configuration information and through another corresponding second interconnection network, independently configuring a second plurality of computational elements of the pluralities of fixed and differing computational elements for performance of a second, different corresponding data operation of the plurality of data operations; and
through the first interconnection network, selectively transferring data or control information to the first and second pluralities of computational elements.

32. An integrated circuit, comprising:
a first plurality of heterogeneous computational elements;
a first interconnection network coupled to the first plurality of heterogeneous computational elements and adapted, in response to first configuration information, to configure the first plurality of heterogeneous computational elements to form a first circuit;
a second plurality of heterogeneous computational elements;
a second interconnection network coupled to the second plurality of heterogeneous computational elements and adapted, in response to second configuration information, to configure the second plurality of heterogeneous computational elements to form a second, different circuit; and
a third interconnection network adapted to selectively transfer data or control between or among the first and second pluralities of heterogeneous computational elements or the first or second interconnection networks.

33. The integrated circuit of claim 32, wherein the first and second pluralities of heterogeneous computational elements comprise different arrays of fixed and differing computational elements.

34. The integrated circuit of claim 32, wherein the first and second pluralities of heterogeneous computational elements comprise at least one internally configurable computational element and at least one fixed computational element.

35. The integrated circuit of claim 34, wherein the at least one internally configurable computational element further comprises a configurable gate array, a configurable function array, or a configurable logic block.

36. The integrated circuit of claim 32, wherein the first interconnection network is further adapted to reconfigure the first plurality of heterogeneous computational elements to form a third different circuit in response to third configuration information, and the second interconnection network is further adapted to reconfigure the second plurality of heterogeneous computational elements to form a fourth different circuit in response to fourth configuration information.

37. The integrated circuit of claim 32, further comprising:
a processor element coupled to the third interconnection network, wherein the processor element is a reduced instruction set (RISC) processor, a digital signal processor, a microprocessor, or a finite state machine.

38. The integrated circuit of claim 32, further comprising:
a plurality of memory elements, a first memory element of the plurality of memory elements coupled to the first interconnection network and adapted to store the first configuration information as a first look up table and a second memory element of the plurality of memory elements coupled to the second interconnection network and adapted to store the second configuration information as a second look up table.

39. The integrated circuit of claim 38, further comprising:
a configuration bus adapted to selectively transfer the first and second configuration information to the first and second memory elements, respectively.

40. The integrated circuit of claim 32, wherein the first and second interconnection networks further comprise a plurality of switching elements adapted to selectively circuit switch data to or from the first or second pluralities of heterogeneous computational elements, and wherein the plurality of switching elements comprise multiplexers or demultiplexers.

41. The integrated circuit of claim 32, wherein the first and second interconnection networks further comprise a plurality of switching elements adapted to couple selected data outputs and selected data inputs of the first or second pluralities of heterogeneous computational elements and to maintain the data output and data input couplings until a subsequent reconfiguration of the first, second or third interconnection networks.

42. The integrated circuit of claim 32, wherein at least one computational element of the first or second pluralities of heterogeneous computational elements is parameterizable.

43. The integrated circuit of claim 32, wherein the third interconnection network is indirectly coupled to the first and second pluralities of heterogeneous computational elements through the respective first and second interconnection networks.

44. The integrated circuit of claim 32, wherein, the third interconnection network is further adapted to selectively route a plurality of data packets to the first and second pluralities of computational elements using a corresponding address field of each data packet.

45. An integrated circuit, comprising:

a first plurality of different computational elements comprising a first computational element having a first fixed architecture and a second computational element having a second architecture;

a first interconnection network coupled to and adapted to configure the first plurality of different computational elements to form a first circuit in response to first configuration information;

a second plurality of different computational elements comprising a first computational element having the first fixed architecture and a second computational element having the second architecture;

a second interconnection network coupled to and adapted to independently configure the second plurality of different computational elements to form a second, different circuit in response to second configuration information; and a third interconnection network adapted to selectively transfer data and control information between or among the first and second pluralities of heterogeneous computational elements or the first or second interconnection networks.

46. An integrated circuit, comprising:

a first plurality of heterogeneous computational elements, at least one computational element of the first plurality of heterogeneous computational elements having a first fixed architecture;

a first interconnection network adapted to configure the first plurality of heterogeneous computational elements using first configuration information to provide a first configuration;

a second plurality of heterogeneous computational elements, at least one computational element of the second plurality of heterogeneous computational elements having a second, different architecture;

a second, interconnection network adapted to separately configure the second plurality of heterogeneous computational elements using second configuration information to provide a second, different configuration; and a third interconnection network configurable to selectively transfer data or control between or among the first and second pluralities of heterogeneous computational elements or the first or second interconnection networks.

* * * * *